(12) United States Patent
Yamashita et al.

(10) Patent No.: US 7,167,602 B2
(45) Date of Patent: Jan. 23, 2007

(54) INTERPOLATION PIXEL VALUE DETERMINING METHOD

(75) Inventors: Syugo Yamashita, Hirakata (JP); Masahiko Yoshiyama, Daito (JP)

(73) Assignee: Sanyo Electric Co., Ltd., Osaka (JP)

( * ) Notice: Subject to any disclaimer, the term of this patent is extended or adjusted under 35 U.S.C. 154(b) by 884 days.

(21) Appl. No.: 10/190,753

(22) Filed: Jul. 9, 2002

(65) Prior Publication Data

US 2003/0077001 A1    Apr. 24, 2003

(30) Foreign Application Priority Data

Jul. 9, 2001    (JP)    ............................. 2001-207962

(51) Int. Cl.
  *G06K 9/32*    (2006.01)
(52) U.S. Cl. ...................... 382/300; 382/288
(58) Field of Classification Search ................ 382/300, 382/288
  See application file for complete search history.

(56) References Cited

U.S. PATENT DOCUMENTS

| | | | |
|---|---|---|---|
| 4,890,160 A * | 12/1989 | Thomas | ................... 348/429.1 |
| 5,148,501 A * | 9/1992 | Enomoto et al. | ........... 382/233 |
| 5,805,736 A * | 9/1998 | Kim | ........................... 382/242 |
| 6,452,639 B1 * | 9/2002 | Wagner et al. | .............. 348/448 |
| 6,754,402 B1 * | 6/2004 | Matama | ...................... 382/300 |

* cited by examiner

*Primary Examiner*—Daniel Miriam
*Assistant Examiner*—Dennis Rosario
(74) *Attorney, Agent, or Firm*—McDermott Will & Emery LLP

(57) ABSTRACT

Disclosed is an interpolation pixel value determining method for dividing a unit region including the contour of an object into reference unit sections for each line along a predetermined direction, to find, using a region interposed between the two reference unit sections as an interpolation unit section, an interpolation pixel value in the interpolation unit section, in which a luminance total and a center of gravity are calculated in each of the two reference unit sections with the interpolation unit section interposed therebetween, the estimated values of a luminance total and a center of gravity in the interpolation unit section are found from the luminance totals and the centers of gravity in the two reference unit sections, and each of interpolation pixel values in the interpolation unit section is determined such that the luminance total and the center of gravity in the interpolation unit section are respectively values close to the estimated values.

5 Claims, 26 Drawing Sheets

FIG. 6

| | | \multicolumn{6}{c}{x-COORDINATE} | | | | | |
|---|---|---|---|---|---|---|---|
| | | 1 | 2 | 3 | 4 | 5 | 6 |
| y-COORDINATE | 1 | 1 | 1 | 1 | 1 | 1 | 76 |
| | 2 | 1 | 1 | 1 | 1 | 26 | 101 |
| | 3 | 1 | 1 | 1 | 1 | 76 | 101 |
| | 4 | 1 | 1 | 1 | 26 | 101 | 101 |
| | 5 | 1 | 1 | 1 | 76 | 101 | 101 |
| | 6 | 1 | 1 | 26 | 101 | 101 | 101 |
| | 7 | 1 | 1 | 76 | 101 | 101 | 101 |
| | 8 | 1 | 26 | 101 | 101 | 101 | 101 |
| | 9 | 1 | 76 | 101 | 101 | 101 | 101 |
| | 10 | 26 | 101 | 101 | 101 | 101 | 101 |
| | 11 | 76 | 101 | 101 | 101 | 101 | 101 |

FIG. 7

| | | \multicolumn{8}{c}{x-COORDINATE} | | | | | | | |
|---|---|---|---|---|---|---|---|---|---|
| | | 1 | 2 | 3 | 4 | 5 | 6 | 7 | 8 |
| y-COORDINATE | 1 | 1 | 1 | 1 | 1 | 1 | 64 | 84 | 5 |
| | 2 | 1 | 1 | 1 | 1 | 39 | 97 | 18 | 1 |
| | 3 | 1 | 1 | 1 | 18 | 97 | 39 | 1 | 1 |
| | 4 | 1 | 1 | 5 | 84 | 64 | 1 | 1 | 1 |
| | 5 | 1 | 1 | 64 | 84 | 5 | 1 | 1 | 1 |
| | 6 | 1 | 39 | 97 | 18 | 1 | 1 | 1 | 1 |
| | 7 | 18 | 97 | 39 | 1 | 1 | 1 | 1 | 1 |

| y-COORDINATE \ x-COORDINATE | 1 | 2 | 3 | 4 | 5 | 6 |
|---|---|---|---|---|---|---|
| 4 | 1 | 1 | 1 | 26 | 101 | 101 |
| 5 |   |   |   |   |   |   |
| 6 | 1 | 1 | 26 | 101 | 101 | 101 |

| | RELATIVE x-COORDINATE | | | | ON EACH LINE | | |
|---|---|---|---|---|---|---|---|
| | 1 | 2 | 3 | 4 | LUMINANCE TOTAL | MOMENT | CENTER OF GRAVITY |
| RELATIVE y-COORDINATE 1 | 1 | 1 | 26 | 101 | 129 | 485 | 3.76 |
| 2 | 1 | | | 101 | 179 | 633.66 | 3.54 |
| 3 | 1 | 26 | 101 | 101 | 229 | 760 | 3.32 |

FIG. 18

| | RELATIVE x-COORDINATE | | | | | | ON EACH LINE | | |
|---|---|---|---|---|---|---|---|---|---|
| | 1 | 2 | 3 | 4 | 5 | 6 | LUMINANCE TOTAL | MOMENT | CENTER OF GRAVITY |
| y-COORDINATE 1 | | | 18 | 97 | 39 | | 157 | 644.3 | 4.12 |
| y-COORDINATE 2 | 1 | | 90.5 | | 3 | 1 | 156 | 527.8 | 3.38 |
| y-COORDINATE 3 | | 64 | 84 | 5 | | | 156 | 411.8 | 2.64 |

FIG. 19

| | RELATIVE x-COORDINATE | | | | | | ON EACH LINE | | |
|---|---|---|---|---|---|---|---|---|---|
| | 1 | 2 | 3 | 4 | 5 | 6 | LUMINANCE TOTAL | MOMENT | CENTER OF GRAVITY |
| y-COORDINATE 1 | | | 18 | 97 | 39 | | 157 | 644.3 | 4.12 |
| y-COORDINATE 2 | 1 | 3.6 | 90.5 | 56.7 | 3 | 1 | 156 | 527.3 | 3.39 |
| y-COORDINATE 3 | | 64 | 84 | 5 | | | 156 | 411.8 | 2.64 |

FIG. 20

| | RELATIVE x-COORDINATE | | | | | | ON EACH LINE | | |
|---|---|---|---|---|---|---|---|---|---|
| | 1 | 2 | 3 | 4 | 5 | 6 | LUMINANCE TOTAL | MOMENT | CENTER OF GRAVITY |
| y-COORDINATE 1 | | | 18 | 97 | 39 | | 157 | 644.3 | 4.12 |
| y-COORDINATE 2 | 1 | | | | | 1 | 156 | 527.8 | 3.38 |
| y-COORDINATE 3 | | 64 | 84 | 5 | | | 156 | 411.8 | 2.64 |

| PATTERN | RELATIVE x-COORDINATE | | | | | | ON EACH LINE | | |
|---|---|---|---|---|---|---|---|---|---|
| | 1 | 2 | 3 | 4 | 5 | 6 | LUMINANCE TOTAL | MOMENT | CENTER OF GRAVITY |
| A: UPPER LINE | 1 | 1 | 18 | 97 | 39 | 1 | 157 | 644.3 | 4.12 |
| A' | 1 | 18 | 97 | 39 | 1 | 1 | 157 | 495.0 | 3.15 |
| A" | 1 | 39 | 97 | 18 | 1 | 1 | 157 | 453.0 | 2.89 |
| B: LOWER LINE | 1 | 64 | 84 | 5 | 1 | 1 | 156 | 412.0 | 2.64 |
| B' | 1 | 64 | 84 | 5 | 1 | 1 | 156 | 412.0 | 2.64 |
| B" | 1 | 5 | 84 | 64 | 1 | 1 | 156 | 530.0 | 3.40 |

FIG. 23

| PROCESSING CLASSIFICATION | RELATIVE x-COORDINATE ||||||| ON EACH LINE |||
| --- | --- | --- | --- | --- | --- | --- | --- | --- | --- |
| | 1 | 2 | 3 | 4 | 5 | 6 | LUMINANCE TOTAL | MOMENT | CENTER OF GRAVITY |
| DESIRED VALUE | 1 | | | | 1 | 1 | 156 | 528 | 3.38 |
| INITIAL PATTERN | 1 | 18 | 97 | 39 | 1 | 1 | 157 | 495 | 3.15 |
| CHANGE OF MAXIMUM AND MINIMUM VALUES | 1 | 18 | 90 | 39 | 1 | 1 | 150 | 474 | 3.16 |
| ADJUSTMENT OF TOTAL LUMINANCE | 1 | 21 | 90 | 42 | 1 | 1 | 156 | 492 | 3.15 |
| ADJUSTMENT OF EDGE SHAPE | 1 | 21 | 90 | 42 | 1 | 1 | 156 | 492 | 3.15 |
| ADJUSTMENT OF MOMENT | 1 | 3 | 90 | 60 | 1 | 1 | 156 | 528 | 3.38 |
| ADJUSTMENT OF EDGE SHAPE | 1 | 3 | 90 | 60 | 1 | 1 | 156 | 528 | 3.38 |

INTERPOLATION PIXEL VALUE DETERMINING METHOD

BACKGROUND OF THE INVENTION

1. Field of the Invention

The present invention relates to an interpolation pixel value determining method used when interlaced scanning is converted into sequential scanning or when scaling processing is performed and a method of calculating the amount of movement of the contour of an object.

2. Description of the Prior Art

Representatives of methods of producing an interpolation line in a case where interlaced scanning is converted into sequential scanning (IP conversion) are inter-field interpolation and in-field interpolation.

The inter-field interpolation is a method of simply performing interpolation between the current field and the preceding field, to produce an interpolation line. The in-field interpolation is a method of performing inter-line interpolation or interpolation by an oblique correlation in the current field, to produce an interpolation line.

Generally, the inter-field interpolation is employed when an image is a still image or when an image is a moving image but hardly moves, while the in-field interpolation is employed when the image is a moving image and greatly moves.

SUMMARY OF THE INVENTION

An object of the present invention is to provide an interpolation pixel value determining method in which highly precise interpolation can be performed in a contour.

A first interpolation pixel value determining method according to the present invention is characterized by determining, in a unit region including the contour of an object, the pixel value of an interpolation pixel in the unit region on the basis of the rule that at least one of a center of gravity, a moment, and a luminance total changes with continuity or linearity.

A second interpolation pixel value determining method according to the present invention is an interpolation pixel value determining method for dividing a unit region including the contour of an object into reference unit sections for each line along a predetermined direction, and finding, using a region interposed between the two reference unit sections as an interpolation unit section, interpolation pixel values in the interpolation unit section, characterized by comprising the steps of calculating a luminance total and a center of gravity in each of the two reference unit sections with the interpolation unit section interposed therebetween; finding from the luminance totals and the centers of gravity in the two reference unit sections the estimated values of a luminance total and a center of gravity in the interpolation unit section; and determining each of the interpolation pixel values in the interpolation unit section such that the luminance total and the center of gravity in the interpolation unit section are respectively values close to the estimated values.

A third interpolation pixel value determining method according to the present invention is characterized by comprising a first step of detecting an edge, and setting two reference unit sections, which are parallel to each other, each including the detected edge and composed of an existent pixel train; a second step of setting an interpolation unit section in a region interposed between the two reference unit sections; a third step of calculating a center of gravity in each of the reference unit sections; a fourth step of shifting, using a point just intermediate between the respective centers of gravity in both the reference unit sections as a center of gravity in the interpolation unit section, each of the reference unit sections such that the center of gravity in each of the reference unit sections coincides with the center of gravity in the interpolation unit section; and a fifth step of calculating the pixel value of each of pixels in the interpolation unit section on the basis of the pixel values in both the reference unit sections after the shifting in consideration of the positional relationship between each of pixels in both the reference unit sections after the shifting and each of pixels in the interpolation unit section.

An example of the fifth step in the third interpolation pixel value determining method comprises the step of calculating, in a state where each of the reference unit sections is shifted, for each of the interpolation pixels in the interpolation unit section, a first estimated value of the interpolation pixel from one or two pixels existing in a portion corresponding to the interpolation pixel in one of the reference unit sections, and the step of calculating for each of the interpolation pixels in the interpolation unit section a second estimated value of the interpolation pixel from one or two pixels existing in a portion corresponding to the interpolation pixel in the other reference unit section, and the step of calculating for each of the interpolation pixels in the interpolation unit section an average value of the estimated values calculated from both the reference unit sections with respect to the interpolation pixel, to find each of the interpolation pixel values in the interpolation unit section.

A fourth interpolation pixel value determining method according to the present invention is characterized by comprising a first step of detecting an edge, and setting two reference unit sections, which are parallel to each other, each including the detected edge and composed of an existent pixel train; a second step of setting an interpolation unit section in a region interposed between the two reference unit sections; a third step of calculating a center of gravity in each of the reference unit sections; a fourth step of shifting, using a point just intermediate between the centers of gravity in both the reference unit sections as a center of gravity in the interpolation unit section, each of the reference unit sections such that the center of gravity in each of the reference unit sections coincides with the center of gravity in the interpolation unit section; a fifth step of calculating, in a state where each of the reference unit sections is shifted, for each of the interpolation pixels in the interpolation unit section a first estimated value of the interpolation pixel from one or two pixels existing in a portion corresponding to the interpolation pixel in one of the reference unit sections, and calculating for each of the interpolation pixels in the interpolation unit section a second estimated value of the interpolation pixel from one or two pixels existing in a portion corresponding to the interpolation pixel in the other reference unit section; a sixth step of calculating for each of the interpolation pixels in the interpolation unit section an average value of the estimated values calculated from both the reference unit sections with respect to the interpolation pixel, to find a third estimated value of the interpolation pixel; and a seventh step of taking as a first virtual interpolation unit section a pixel train in a case where it is assumed that the value of each of the interpolation pixels in the interpolation unit section is the first estimated value found in the fifth step, taking as a second virtual interpolation unit section a pixel train in a case where it is assumed that the value of each of the interpolation pixels in the interpolation unit section is the second estimated value found in the fifth step, and taking as a third virtual interpolation unit section a pixel train in a case where it is assumed that the value of each of the interpolation pixels in the interpolation unit section is the third estimated value found in the sixth step, to calculate respective centers of gravity in the first to third virtual interpolation unit sections, and taking, out of the three virtual interpolation unit sections, each of pixel values in the virtual interpolation unit section in which the center of gravity is closest to the center of gravity in the interpolation unit section calculated from the centers of gravity in the two reference unit sections as a interpolation pixel value in the interpolation unit section.

A fifth interpolation pixel value determining method according to the present invention is characterized by comprising a first step of detecting an edge, and setting two reference unit sections, which are parallel to each other, each including the detected edge and composed of an existent pixel train; a second step of setting an interpolation unit section in a region interposed between the two reference unit sections; a third step of calculating a center of gravity in each of the reference unit sections; a fourth step of setting a center of gravity in an interpolation unit section on a straight line connecting the centers of gravity in both the reference unit sections, and shifting each of the reference unit sections such that the center of gravity in each of the reference unit sections coincides with the center of gravity in the interpolation unit section; and a fifth step of calculating the pixel value of each of pixels in the interpolation unit section on the basis of pixel values in both the reference unit sections after the shifting in consideration of the positional relationship between each of pixels in both the reference unit sections after the shifting and each of pixels in the interpolation unit section.

A first method of calculating the amount of movement of the contour of an object according to the present invention is characterized by comprising the steps of setting a plurality of unit sections, which are parallel to each other, in a unit region including the contour of an object; calculating a center of gravity in each of the unit sections; and finding the distance between the centers of gravity in the adjacent unit sections as the amount of movement of the contour of the object between the adjacent unit sections.

A second method of calculating the amount of movement of the contour of an object according to the present invention is characterized by comprising the steps of detecting an edge; setting two reference unit sections, which are parallel to each other, each including the detected edge and composed of an existent pixel train; calculating a center of gravity in each of the reference unit sections; and finding the distance between the centers of gravity in both the reference unit sections as the amount of movement of the contour of the object between the adjacent unit sections.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a schematic view showing a pixel value on an existent line in a side-edge and an ideal value obtained by interpolation;

FIG. 7 is a schematic view showing a pixel value on an existent line in a both-edge and an ideal value obtained by interpolation;

FIG. 18 is a schematic view showing a center of gravity, a luminance total, and a moment on each line in a hatched portion shown in FIG. 7, and an interpolation value found by a strong correlation, taking a threshold value for strong correlation processing as five;

FIG. 19 is a schematic view showing a result obtained in finding undetermined interpolation pixels in FIG. 18;

FIG. 20 is a schematic view showing a center of gravity, a luminance total, and a moment on each line in a hatched portion shown in FIG. 7, and an interpolation value found by a strong correlation, taking a threshold value for strong correlation processing as four;

FIG. 23 is a schematic view showing an example of conduction of sequential search;

DESCRIPTION OF THE PREFERRED EMBODIMENTS

[A] Description of First Embodiment

[1] Description of Basic Idea

The feature of the present invention is that a center of gravity is utilized when the luminance of an interpolation pixel is determined by in-field interpolation in a contour (an edge) of an object.

Figure 1:
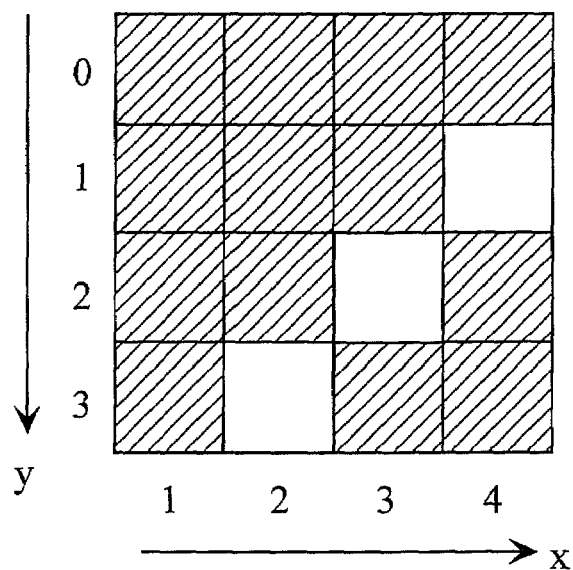
FIG. 1 is a schematic view showing a region including one straight line (a contour line)

Suppose a region including one straight line (a contour line) as shown in FIG. 1.

In a case where a luminance value at a position indicated by x- and y-coordinates is taken as $Y_{y,x}$, a total $S_j$ of luminance values on the j-th line is found by the following equation (1):

$$S_j = Y_{j,1} + Y_{j,2} + Y_{j,3} + Y_{j,4} \tag{1}$$

A moment Mj and a center of gravity Gj with the x-coordinate 0 on the j-th line as a starting point are found by the following equation (2);

$$M_j = Y_{j,1} + 2 \times Y_{j,2} + 3 \times Y_{j,3} + 4 \times Y_{j,4} \quad G_j = M_j / S_j \tag{2}$$

Figure 2:
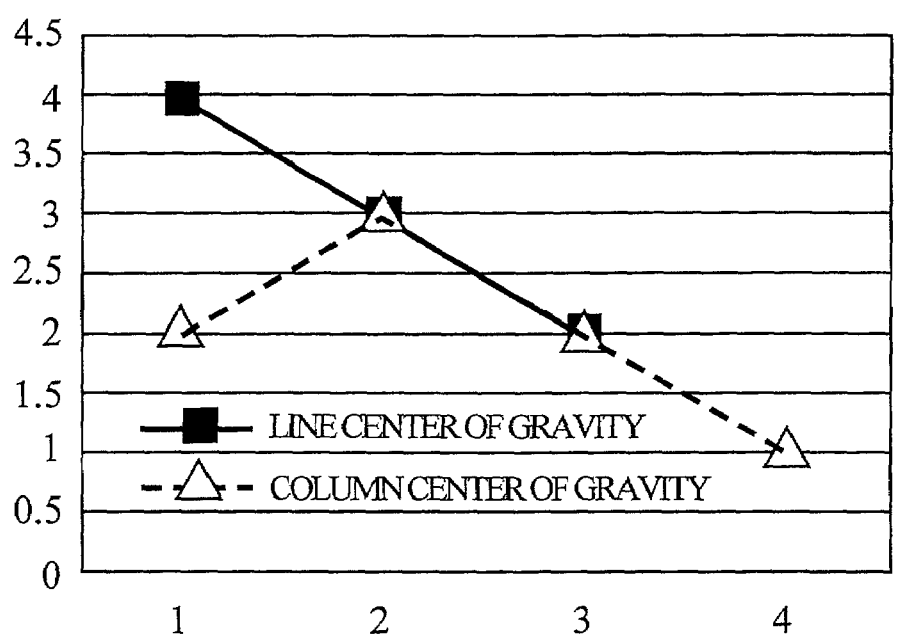
FIG. 2 is a graph showing a center of gravity on each line (a line center of gravity) and a center of gravity in each column (a column center of gravity) in FIG. 1.

When the luminance of a black portion (a hatched portion) and the luminance of a white portion shown in FIG. 1 are respectively taken as 1 and 101, a luminance total and a center of gravity (a line center of gravity) on each horizontal line are as shown in Table 1 and FIG. 2. Table 1 shows that the center of gravity on each horizontal line is linear, and the luminance total thereon is also linear:

TABLE 1

| | | X-coordinate | | | | on each line | | |
|---|---|---|---|---|---|---|---|---|
| | | 1 | 2 | 3 | 4 | luminance total | moment | center of gravity |
| y-coordinate | 1 | 1 | 1 | 1 | 101 | 104 | 410 | 3.94 |
| | 2 | 1 | 1 | 101 | 1 | 104 | 310 | 2.98 |
| | 3 | 1 | 101 | 1 | 1 | 104 | 210 | 2.02 |

In the present embodiment, the luminance of the interpolation pixel is determined in accordance with the following two rules;

① If the whole or a part of the object enters all unit sections in a unit region in an approximately equal ratio, a luminance total linearly changes in the unit region.

② If the whole or a part of the object enters all unit sections in a unit region in an approximately equal ratio, a center of gravity linearly changes in the unit region.

The rules will be explained in plane language. Image data values, described above, are as shown in Table 2 and FIG. 2 when luminance totals and centers of gravity (column centers of gravity) on each vertical line (in each column) are found. The image data values satisfy linearity, excluding the center of gravity against an x-coordinate 1, as shown in Table 2 and FIG. 2. The reason why the center of gravity against the x-coordinate 1 does not satisfy linearity is that no straight line is included in a column "x-coordinate 1" shown in FIG. 1.

TABLE 2

|  |  | x-coordinate | | | | on each line | | |
|---|---|---|---|---|---|---|---|---|
|  |  | | | | | luminance | | center of |
|  |  | 1 | 2 | 3 | 4 | total | moment | gravity |
| y-coordinate | 1 | 1 | 1 | 1 | 101 | 104 | 410 | 3.94 |
|  | 2 | 1 | 1 | 101 | 1 | 104 | 310 | 2.98 |
|  | 3 | 1 | 101 | 1 | 1 | 104 | 210 | 2.02 |
| on each column | luminance total | 3 | 103 | 103 | 103 | | | |
|  | moment | 6 | 306 | 206 | 106 | | | |
|  | center of gravity | 2.00 | 2.97 | 2.00 | 1.03 | | | |

Figure 3:
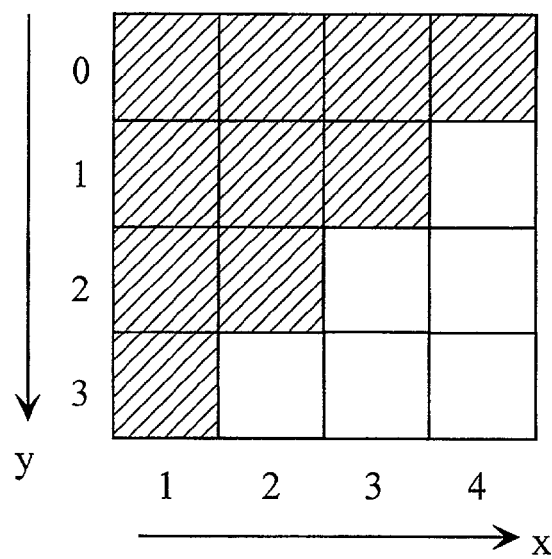
FIG. 3 is a schematic view showing a region including an edge which is a part of an object.
Figure 4:
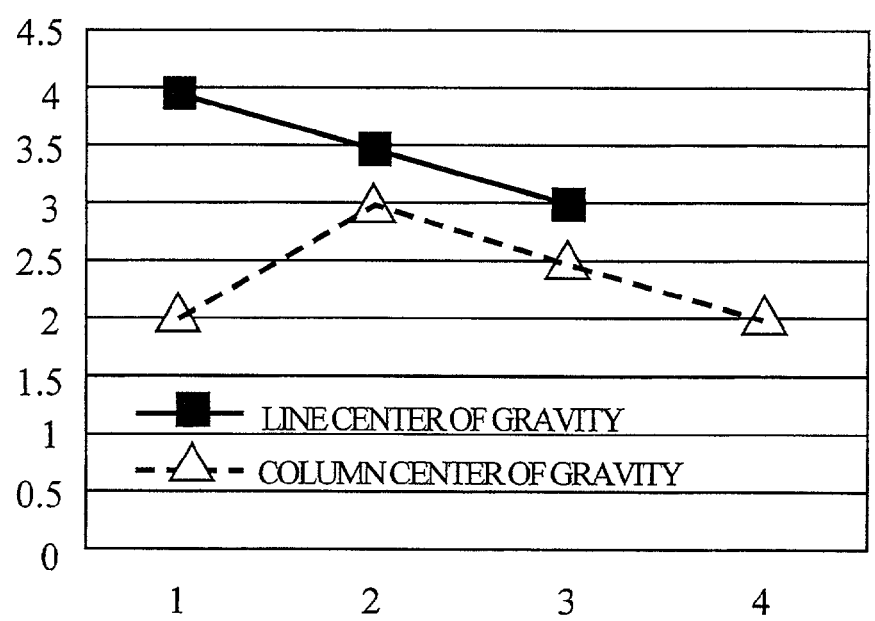
FIG. 4 is a graph showing a center of gravity on each line (a line center of gravity) and a center of gravity in each column (a column center of gravity) in FIG. 3.

Even if the edge which is a part of the object enters all the unit sections in an approximately equal ratio, as shown in FIG. 3, the above-mentioned linearity is satisfied, as apparent from Table 3 and FIG. 4.

TABLE 3

|  |  | x-coordinate | | | | on each line | | |
|---|---|---|---|---|---|---|---|---|
|  |  | | | | | luminance | | center of |
|  |  | 1 | 2 | 3 | 4 | total | moment | gravity |
| y-coordinate | 1 | 1 | 1 | 1 | 101 | 104 | 410 | 3.94 |
|  | 2 | 1 | 1 | 101 | 101 | 204 | 710 | 3.48 |
|  | 3 | 1 | 101 | 101 | 101 | 304 | 910 | 2.99 |
| on each column | luminance total | 3 | 103 | 203 | 303 | | | |
|  | moment | 6 | 306 | 506 | 606 | | | |
|  | center of gravity | 2.00 | 2.97 | 2.49 | 2.00 | | | |

In addition thereto, the unit sections can be set not only in x- and y-directions but also arbitrarily if the whole or a part of the object enters the unit sections in an approximately equal ratio. For example, when a straight line sloping upward toward the right shown in FIG. 1 (a direction of an hour hand at 1:30 in a clock) is viewed obliquely from the upper left (a direction of an hour hand at 10:30 in the clock), a center of gravity is fixed.

Consequently, scanning line interpolation is possible using the following two rules:

① If the whole or a part of the object enters the unit sections in an approximately equal ratio, a luminance total linearly changes in the unit region including the unit sections.

② If the whole or a part of the object enters the unit sections in an approximately equal ratio, a center of gravity linearly changes in the unit region including the unit sections.

In the scanning line interpolation for an interlaced input image, a center of gravity on a horizontal line is easily found, and the utilization range of a center of gravity on a vertical line (column) is limited because an interpolation line is unknown. Therefore, an interpolation pixel value is found utilizing the center of gravity on the horizontal line.

An interpolation method (hereinafter referred to as a G method) utilizing the center of gravity in sequential scanning conversion is used in the place where there is a certain degree of movement within a video. The reason for this is that in a portion where there is no movement in the video, a better image quality is obtained if inter-field interpolation is performed as in the prior art.

[2] Description of Outline of Processing Procedure in Case Where G Method is Applied to Sequential Scanning Conversion (IP Conversion)

Figure 5:
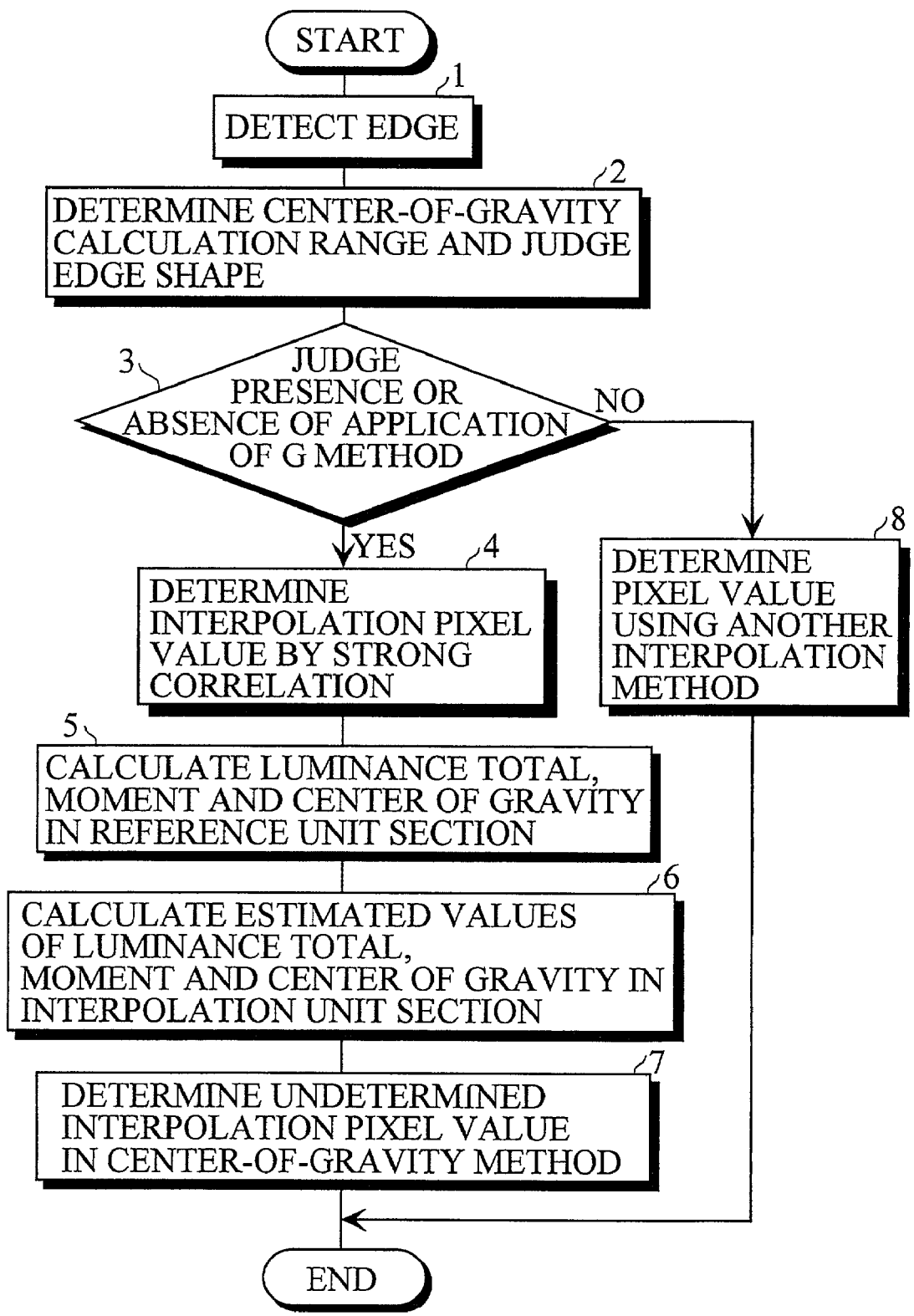
FIG. 5 is a flow chart showing the rough procedure in a case where a G method is applied to sequential scanning conversion.

FIG. 5 shows the rough procedure in a case where a G method is applied to sequential scanning conversion.

A horizontal edge is first detected (step 1). A range in which a center of gravity is calculated (hereinafter referred to as a center-of-gravity calculation range) is then determined, and the shape of the edge is judged (step 2).

Description is made of the shape of the edge. In FIGS. 6 and 7, a luminance value in a hatched line indicates a pixel value on an existent line, and a luminance value in an unhatched line indicates an ideal value obtained by interpolation. A pixel value in a region enclosed by a dotted line in the drawing indicates a region where the G method, described later, is applied.

Examples of the edge shape include an edge formed in the boundary between planes which differ in luminance (hereinafter referred to as a side-edge), as shown in FIG. 6, and an edge composed of one line (hereinafter referred to as a both-edge), as shown in FIG. 7.

It is then judged whether or not the G method is applied (step 3). When it is judged that the G method is not applied, another interpolation method (e.g., linear interpolation) is used, to determine an interpolation pixel value (step 8).

When it is judged that the G method is applied, processing for determining an interpolation pixel value by a strong correlation, described later, is first performed (step 4).

In the following description, a unit section existing on a line to be interpolated is referred to as an interpolation unit section. Further, unit sections existing on existent lines with the interpolation unit section interposed therebetween are referred to as reference unit sections. The upper one of the reference unit sections is referred to as an upper reference unit section, and the lower one of the reference unit sections is referred to as a lower reference unit section.

In order to determine the pixel value of an interpolation pixel which is not determined by the processing for determining an interpolation value by a strong correlation, the following processing is performed.

Processing for calculating a luminance total, a moment, and a center of gravity in the reference unit section is first performed (step 5). Processing for calculating the estimated values (recommended values) of a luminance total, a moment, and a center of gravity in the interpolation unit section is then performed (step 6). Processing for determining an undetermined interpolation pixel value is performed (step 7).

The processing in each of the steps will be described.

(1) Description of Steps 1 and 2

Figure 8:
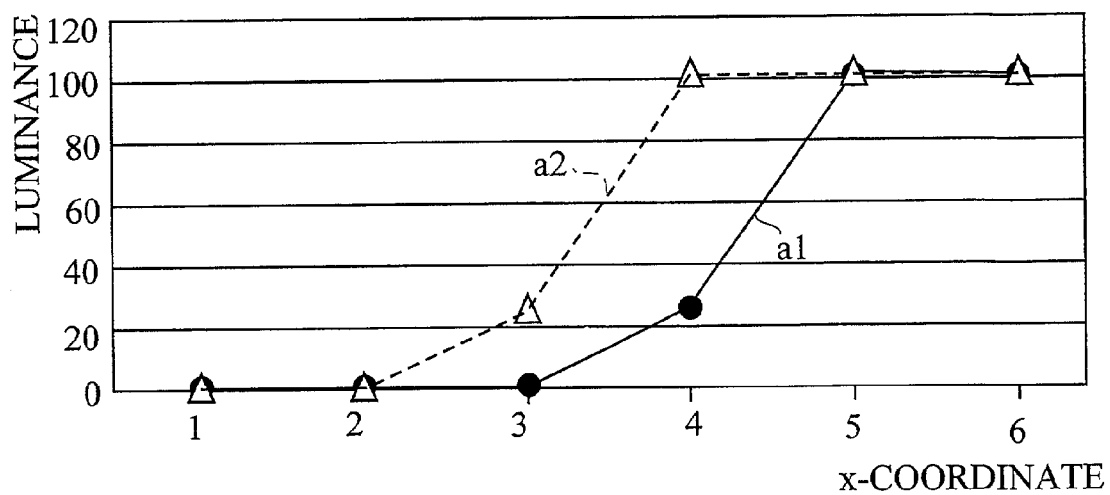
FIG. 8 is a graph showing a pixel value on an existent line (a line 4 or a line 6) enclosed by a dotted line shown in FIG. 6.

(1-1) Determination of Detection of Edge and Center-of-Gravity Calculation Range Pixel values on existent lines (lines 4 and 6) in a portion enclosed by the dotted line shown in FIG. 6 are graphically shown in FIG. 8. In FIG. 8, a graph line a1 indicates a luminance value corresponding to the line 4, and a graph line a2 indicates a luminance value corresponding to the line 6.

Figure 9:
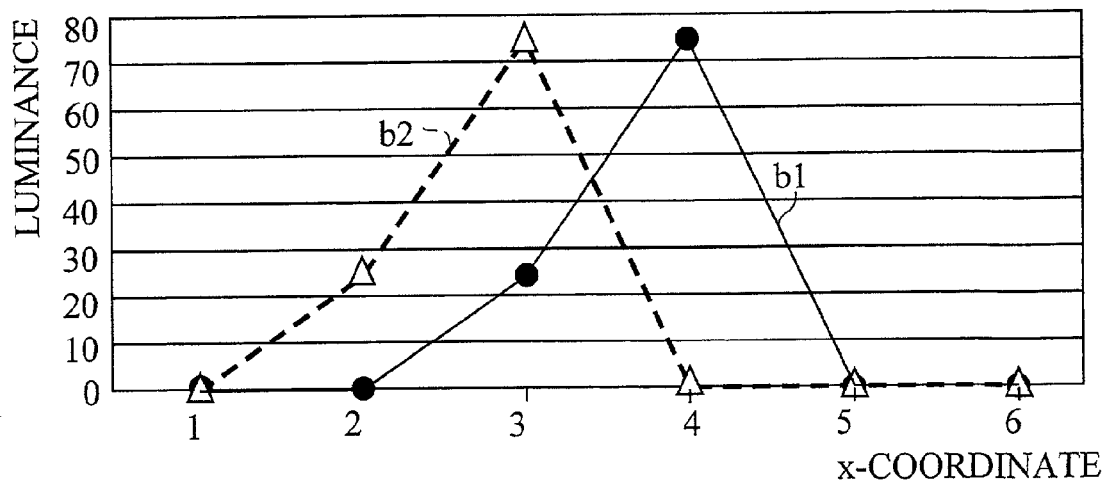
FIG. 9 is a graph showing the absolute value of a result (a difference value) obtained in subjecting a luminance value on an existent line (a line 4 or a line 6) enclosed by a dotted line shown in FIG. 6 to filtering processing using a filter (1, −1)

A result ($Y_{j,1} - Y_{j,(i+1)}$) (hereinafter referred to as a difference value) obtained in subjecting for each of the lines the luminance value on the line to filtering processing using a filter (1, −1) in the horizontal direction is found. The absolute value of the difference value is as shown in FIG. 9. In FIG. 9, a graph line b1 indicates the absolute value of the difference value corresponding to the line 4, and a graph line b2 indicates the absolute value of the difference value corresponding to the line 6.

In the absolute value of the difference value, x-coordinates exceeding a suitable threshold value (e.g., 5) are 2, 3, and 4. When it is considered that the difference value is shifted leftward by the filter (1, −1), the x-coordinates of a unit section (a center-of-gravity calculation range) are 2, 3, 4, and 5.

In this case, the width of an edge, that is, the number of pixels at which the absolute value of the difference value continuously exceeds the threshold value is measured with respect to each of the reference unit sections. The width of the edge measured herein is used at the time of sequential search in the interpolation unit section, described later. In this example, the width of the edge is two pixels respectively having the x-coordinates 3 and 4 in the upper reference unit section, and is two pixels respectively having the x-coordinates 2 and 3 in the lower reference unit section.

(1-2) Judgment of Edge Shape

In Judging the Shape of the Edge, it is Judged Which of a Side-edge or a Both-edge is the Detected Edge.

It is judged which is the both-edge or the side-edge is the edge on the basis of the result (the difference value) obtained in subjecting the luminance value on the existent line to filtering processing using the filter (1, −1) in the horizontal direction. That is, it is judged that the edge is the both-edge when the difference value fluctuates from a negative value to a positive value or a positive value to a negative value with zero interposed therebetween, while being judged that the edge is the side-edge when the difference value is either one of a positive value and a negative value.

Figure 10:
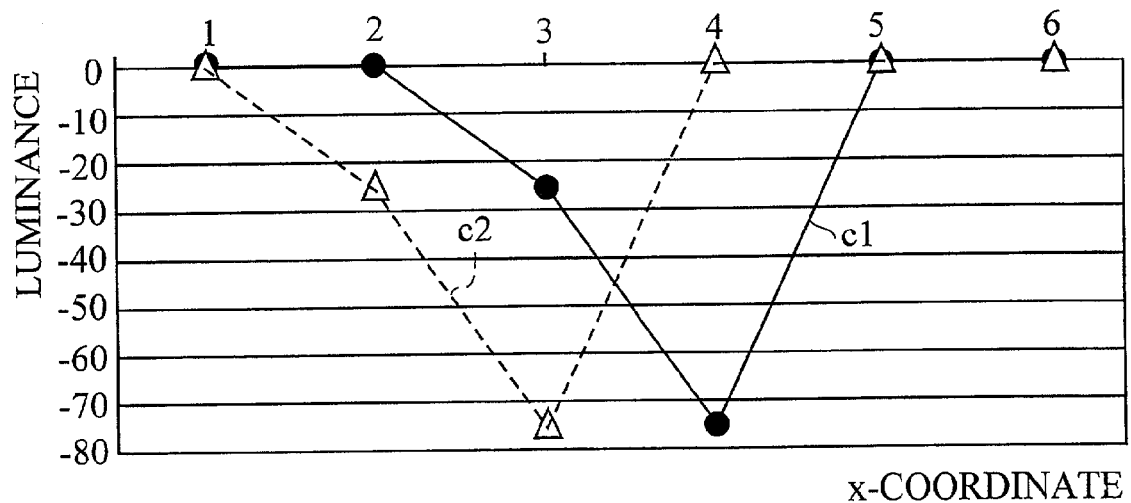
FIG. 10 is a graph showing the absolute value of a result (a difference value) obtained in subjecting a luminance value on an existent line (a line 4 or a line 6) enclosed by a dotted line in FIG. 6 to filtering processing using a filter (1, −1)

A graph line c1 shown in FIG. 10 indicates the difference value corresponding to the line 4 shown in FIG. 6, and a graph line c2 shown in FIG. 10 indicates the difference value corresponding to the line 6 shown in FIG. 6. In FIG. 10, the difference value is only a negative value, whereby it is judged that the edge is the side-edge.

Figure 11:
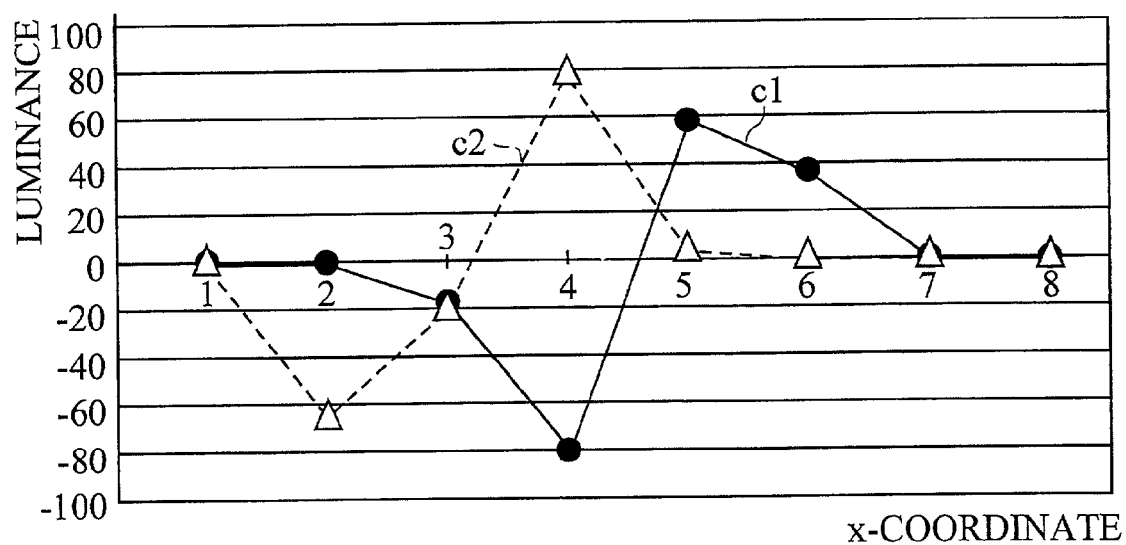
FIG. 11 is a graph showing the absolute value of a result (a difference value) obtained in subjecting a luminance value on an existent line (a line 3 or a line 5) enclosed by a dotted line in FIG. 7 to filtering processing using a filter (1, −1)

A graph line c1 shown in FIG. 11 indicates a difference value corresponding to a line 3 shown in FIG. 7, and a graph line c2 shown in FIG. 11 indicates a difference value corresponding to a line 5 shown in FIG. 7. In FIG. 11, the difference value fluctuates from a negative value to a positive value with zero interposed therebetween, whereby it is judged that the edge is the both-edge.

(2) Description of Processing in Step 3 (Judgment of Presence or Absence of Application of G Method)

The presence or absence of the application of the G method is judged on the basis of a correlation between upper and lower pixels at right and left ends of an extended section obtained by respectively extending both ends of the unit section obtained by the determination of the center-of-gravity calculation range by one pixel. In the above-mentioned example of the side-edge, for example, the X-coordinates of the unit section are 2, 3, 4, and 5. Therefore, the presence or absence is judged in an extended section whose X-coordinates are from 1 to 6.

More specifically, the presence or absence of the application of the G method is judged on the basis of a correlation between upper and lower lines centered at interpolation pixels respectively corresponding to right and left ends of the unit section and right and left ends of the extended section. That is, the difference between the values of corresponding existent pixels (reference pixels) is found in three directions, shown in FIG. 13, centered at the interpolation pixels. If the minimum value of the difference is within a certain threshold value (for example, 5), it is judged that two reference pixels between which there is a minimum difference and an interpolation pixel interposed therebetween have a strong correlation. When the reference pixels and either one of the interpolation pixel at the left end of the unit section and the interpolation pixel at the left end of the extended section have a strong correlation, and the reference pixels and either one of the interpolation pixel at the right end of the unit section and the interpolation pixel at the right end of the extended section have a strong correlation, it is judged that the G method is applicable.

Figures 12, 13:
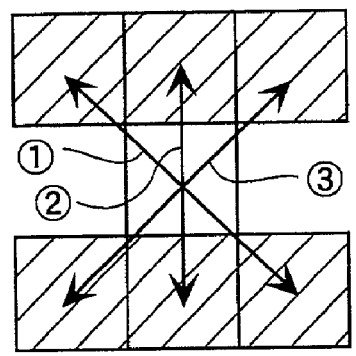
FIG. 12 is a schematic view showing an extended section for judging the presence or absence of the application of a G method.
FIG. 13 is a schematic view showing directions in a case where a correlation between upper and lower lines centered at interpolation pixels corresponding to right and left ends of a unit section and right and left ends of an extended section.

In an example shown in FIG. 12, the difference between a set of y-x coordinates (4, 2) and y-x coordinates (6, 2) in the direction ② shown in FIG. 13 and a set of y-x coordinates (4, 3) and y-x coordinates (6, 1) in the direction ③ shown in FIG. 13 is a minimum "0" and is within a threshold value with respect to the left end of the unit section. Further, the difference between a set of y-x coordinates (4, 5) and y-x coordinates (6, 5) in the direction ② shown in FIG. 13 and a set of y-x coordinates (4, 6) and y-x coordinates (6, 6) in the direction ③ is a minimum "0" and is within a threshold value with respect to the right end of the unit section. Consequently, both the right and left ends of the unit section have a strong correlation, so that the G method is applicable.

It is judged whether or not the processing satisfies the prerequisite of the application of the G method "the whole or a part of an object enters unit sections in an approximately equal ratio".

The prerequisite of the application of the G method will be described herein. The prerequisite of the application of the G method indicates conditions under which the shape of a (true) object in a certain background can be correctly recognized using a center of gravity. The G method produces the largest effect in a case where a background is uniform, and an object having a predetermined luminance is placed thereon. On the other hand, the G method is difficult to apply in a case where there exists a background or an object which is textured and a case where a center of gravity fluctuates depending on how the background or the object is textured.

Figure 14:
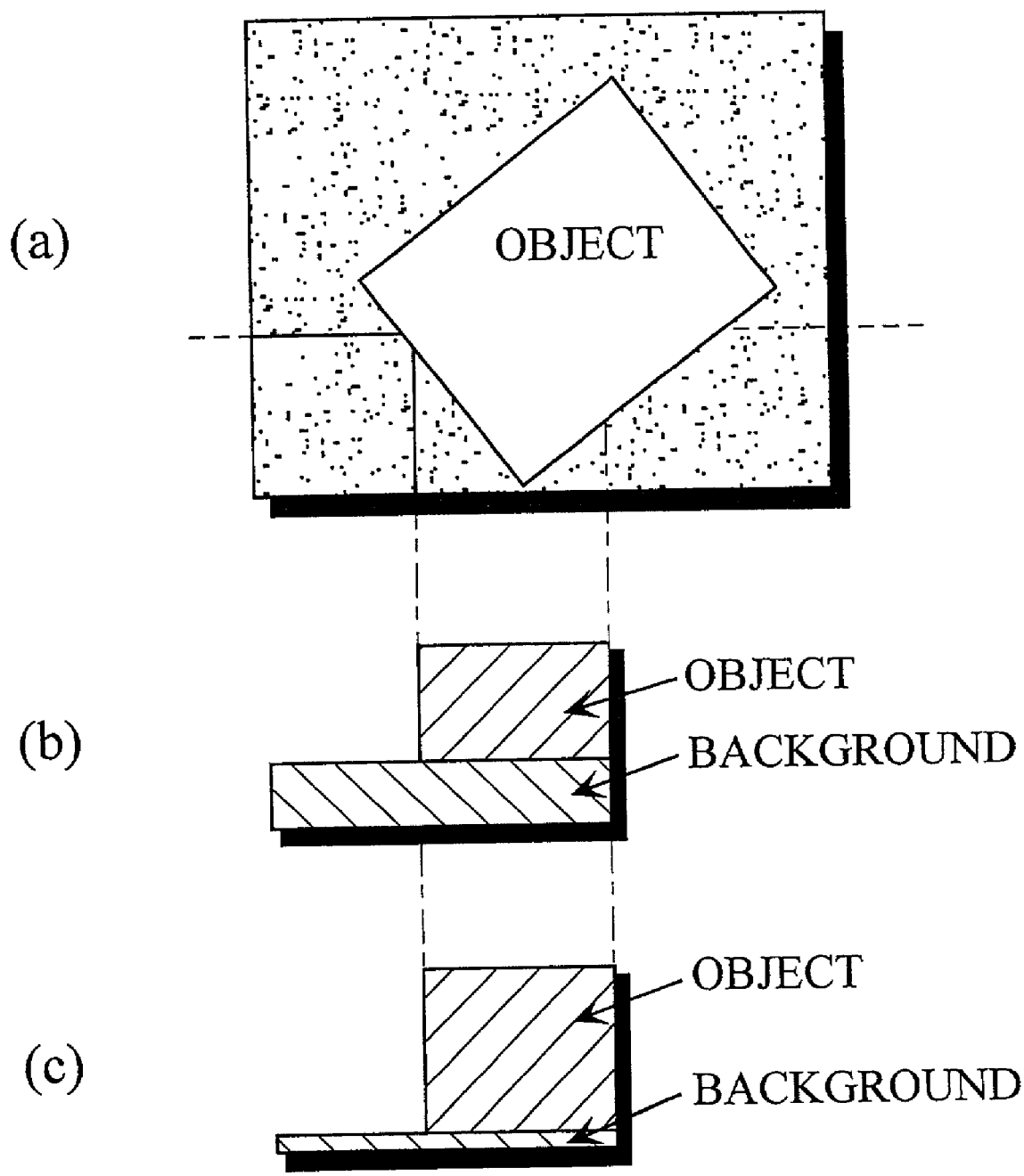
FIG. 14 is a schematic view showing an example of a case where a background is textured.

An example is a case where the background is textured, as shown in FIG. 14(*a*), for example. If it is assumed that the luminance of the background just above a broken line shown in FIG. 14(*a*) is larger than the luminance of the background just below the broken line shown in FIG. 14(*a*), the luminance level of a unit section above the broken line shown in FIG. 14(*a*) is as shown in FIG. 14(*b*), and the luminance level of a unit section below the broken line is as shown in FIG. 14(*c*). Consequently, a center of gravity in the unit section below the broken line is brought nearer rightward than a center of gravity in the unit section above the broken line. A center of gravity in an interpolation section greatly depends on a center of gravity in the background. When the G method is applied to another portion belonging to the same edge, therefore, the contour of the object is in a jagged shape corresponding to the texture of the background, and may, in some cases, be worse in quality than that in linear interpolation.

The phenomenon is merely that in "a real world where an object almost has any texture", to faithfully protect the prerequisite of the G method is to narrow a range in which the G method is applied. As means for easing the prerequisite, a certain threshold value is provided when a strong correlation is found. Although in the previous description of a threshold value, the threshold value is fixed for simplification, the threshold value is made variable depending on the luminance level of the object in actual application. That is, when the difference in luminance level between objects is large, the threshold value can be increased.

Although a threshold value is introduced herein for judging a strong correlation in order to emphasize only a favorable aspect of the G method, the threshold value for a strong correlation can be set to infinity to nullify the threshold value if the disadvantage of the G method is allowed. Also in this case, the difference in concentration between textures is not so large in the real world in many cases, thereby making it possible to obtain a better image quality than that in linear interpolation as a video total.

(3) Description of Processing in Step 4 (Determination of Interpolation Pixel Value by Strong Correlation)

In an edge (a portion which is recognized as a unit section), the luminance value of an interpolation pixel is determined in the following manner in a case where the interpolation pixel shows a strong correlation. In a portion other than the edge, an interpolation value is found by linear interpolation of lines above and below an interpolation line.

The determination of an interpolation pixel value by a strong correlation is made in the following manner. That is, the difference between opposite existent pixel (reference pixel) values is found, in the three directions shown in FIG. 3, centered at an interpolation pixel whose pixel value will be determined. When the difference between the two reference pixel values is a minimum and within a certain threshold value (e.g., 5), an average value of the two reference pixel values is taken as the pixel value of the interpolation pixel.

This processing is performed in parallel with the judgment of the presence or absence of the application of the G method. In the example shown in FIG. 12, for example, the difference between a set of y-x coordinates (4, 2) and y-x coordinates (6, 2) in the direction ② shown in FIG. 13 and a set of y-x coordinates (4, 3) and y-x coordinates (6, 1) in the direction ③ shown in FIG. 13 is a minimum "0" and is within a threshold value with respect to an interpolation pixel at the left end of the unit section (an interpolation pixel having y-x coordinates (5, 2)). Consequently, the interpolation value expressed in the y-x coordinates (5, 2) becomes one by linear interpolation of the pixel value 1 at the y-x coordinates (4, 2) and the pixel value 1 at the y-x coordinates (6, 2) in the direction ②.

The difference between a set of y-x coordinates (4, 5) and y-x coordinates (6, 5) in the direction ② shown in FIG. 13 and a set of y-x coordinates (4, 6) and y-x coordinates (6, 6) in the direction ③ shown in FIG. 13 is a minimum "0" and is within a threshold value with respect to an interpolation pixel at the right end of the unit section (an interpolation pixel having y-x coordinates (5, 5)). Consequently, the interpolation value expressed in the y-x coordinates (5, 2) becomes 101 by linear interpolation of the pixel value 101 at the y-x coordinates (4, 5) and the pixel value 101 at the y-x coordinates (6, 5) in the direction ②.

Figures 15, 16:
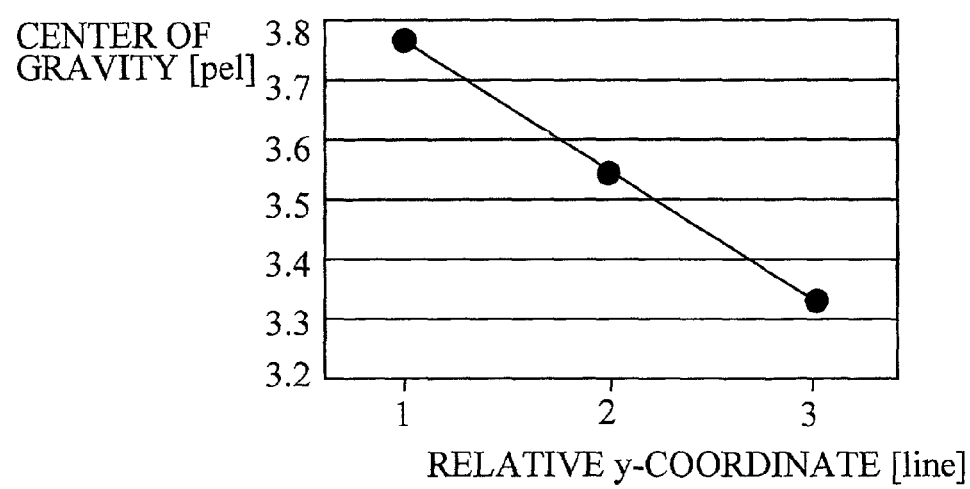
FIG. 15 is a schematic view showing an example in which an x-coordinate and a y-coordinate in FIG. 12 are replaced with relative coordinates.
FIG. 16 is a graph showing a center of gravity G corresponding to a relative Y-coordinate shown in FIG. 15.

In order to simplify later calculation, if the x-coordinate is replaced with a relative coordinate so that the x-coordinate 2 at the left end of the unit section is a relative coordinate 1, and the y-coordinate is replaced with a relative coordinate, the result is as shown in FIG. 15.

(4) Description of Processing in Step 5 (Calculation of Luminance Total S, Moment M, and Center of Gravity G in Reference Unit Section)

When a unit section is composed of N pixels, a luminance total S, a moment M, and a center of gravity G in reference unit sections with an interpolation pixel interposed therebetween are obtained by the following equation (3):

$$S_j = \sum_{i=1}^{N} Y_{j,i}$$

$$M_j = \sum_{i=1}^{N} i \times Y_{j,i}$$

$$G_j = \frac{M_j}{S_j}$$

(3)

In the foregoing equation (3), a subscript indicates a relative y-coordinate, and i indicates a relative x-coordinate.

FIG. 15 shows the luminance total S, the moment M, and the center of gravity G in the reference unit section which are calculated on the basis of the equation (3). FIG. 16 shows a graph of a center of gravity G against a relative Y-coordinate. A unit [pel] of the center of gravity shown in FIG. 16 indicates a pixel.

(5) Description of Processing in Step 6 (Calculation of Estimated Values (Recommended Values) of Luminance Total, Moment M, and Center of Gravity C in Interpolation Unit Section)

The estimated values (recommended values) of a luminance total and a center of gravity in an interpolation unit section are respectively average values of luminance totals S and centers of gravity G in reference unit sections positioned above and below the interpolation unit section. The estimated value (recommended value) of a moment in the interpolation unit section is the product of the recommended value of the luminance total and the recommended value of the center of gravity in the interpolation unit section.

Letting $S_1$, $M_1$, and $G_1$ be the luminance total S, the moment M, and the center of gravity G in the reference unit section positioned above the interpolation unit section, $S_3$, $M_3$, and $G_3$ be the luminance total S, the moment M, and the center of gravity G in the reference unit section positioned below the interpolation unit section, and $S_2$, $M_2$, and $G_2$ be the recommended value of the luminance total S (hereinafter referred to as the recommended luminance total value), the recommended value of the moment M (hereinafter referred to as the recommended moment value), and the recommended value of the center of gravity G (hereinafter referred to as the recommended center-of-gravity value) in the reference unit section, $S_2$, $M_2$, and $G_2$ are expressed by the following equation (4):

$$S_2 = (S_1 + S_3)/2$$

$$G_2 = (G_1 + G_3)/2$$

$$M_2 = S_2 \times G_2 \qquad (4)$$

In the example shown in FIG. 15, $S_2$, $M_2$, and $G_2$ in the interpolation unit section are as follows:

$$S_2 = (129 + 229)/2 = 179$$

$$G_2 = (3.76 + 3.32)/2 = 3.54$$

$$M_2 = 179 \times 3.54 = 633.66$$

(6) Description of Processing in Step 7 (Determination of Undetermined Interpolation Pixel Value in Center-of-Gravity Method)

In the above-mentioned simple example, respective equations expressing a luminance total and a center of gravity are formulated with respect to the interpolation unit section, and their simultaneous equation is solved, thereby finding an undetermined interpolation pixel value. Even by using a moment in place of the center of gravity, the undetermined interpolation pixel value can be determined more simply.

That is, in this example, the following simultaneous equation is solved, thereby finding undetermined interpolation pixel values $Y_{2,2}$ and $Y_{2,3}$:

$$S_2 = Y_{2,1} + Y_{2,2} + Y_{2,3} + Y_{2,4}$$

$$M_2 = Y_{2,1} + 2 \times Y_{2,2} + 3 \times Y_{2,3} + 4 \times Y_{2,4}$$

Known values are substituted in the foregoing simultaneous equation, the following two equations are obtained:

$$S_2 = 179 = 1 + Y_{2,2} + Y_{2,3} + 101$$

$$M_2 = 633.66 = 1 + 2 \times Y_{2,2} + 3 \times Y_{2,3} + 4 \times 101$$

The equations are changed, to obtain the following simultaneous equation:

$$Y_{2,2} + Y_{2,3} = 77$$

$$2 \times Y_{2,2} + 3 \times Y_{2,3} = 228.66$$

The simultaneous equation is solved, to find $Y_{2,2} = 2.5$ and $Y_{2,3} = 74.5$.

Although in the above-mentioned example, description was made using the simple example as a basis, the interpolation pixel value must be determined with reference to the tendency of peripheral pixel values or the like when the number of undetermined interpolation pixels is three or more after determining the interpolation pixel value by a strong correlation.

[3] Description of Generalization of Method of Determining Undetermined Interpolation Pixel Value in Center-of-Gravity Method A method of determining an undetermined interpolation pixel value in a center-of-gravity method will be described while being generalized.

[3-1] Description of Outline of Method of Determining Undetermined Interpolation Pixel Value in Center-of-Gravity Method When a unit section is composed of N pixels, a luminance total Sj, a moment Mj, and a center of gravity Gj in reference unit sections with an interpolation pixel interposed therebetween are found by the following equation (5):

$$S_j = \sum_{i=1}^{N} Y_{j,i} \qquad (5)$$

$$M_j = \sum_{i=1}^{N} i \times Y_{j,i}$$

$$G_j = \frac{M_j}{S_j}$$

Here, a subscript j indicates a relative y-coordinate, i indicates a relative x-coordinate, and the respective subscripts of the reference unit sections with the interpolation pixel interposed therebetween are 1 and 3.

The recommended luminance total value $S_2$ in the interpolation unit section is an average value of the luminance totals $S_1$ and $S_3$ in the reference unit sections positioned above and below the interpolation unit section, as expressed by the following equation (6). Further, the recommended center-of-gravity value $G_2$ in the interpolation unit section is an average value of the centers of gravity $G_1$ and $G_2$ in the reference unit sections positioned above and below the interpolation unit section, as expressed by the following equation (6). Further, the recommended moment value $M_2$ in the interpolation unit section is the product of the recommended luminance total value $S_2$ and the recommended center-of-gravity value $G_2$ in the interpolation unit section, as expressed by the following equation (6):

$$S_2 = (S_1 + S_3)/2$$

$$G_1 = (G_1 + G_3)/2$$

$$M_2 = S_2 \times G_2 \qquad (6)$$

Figure 17:
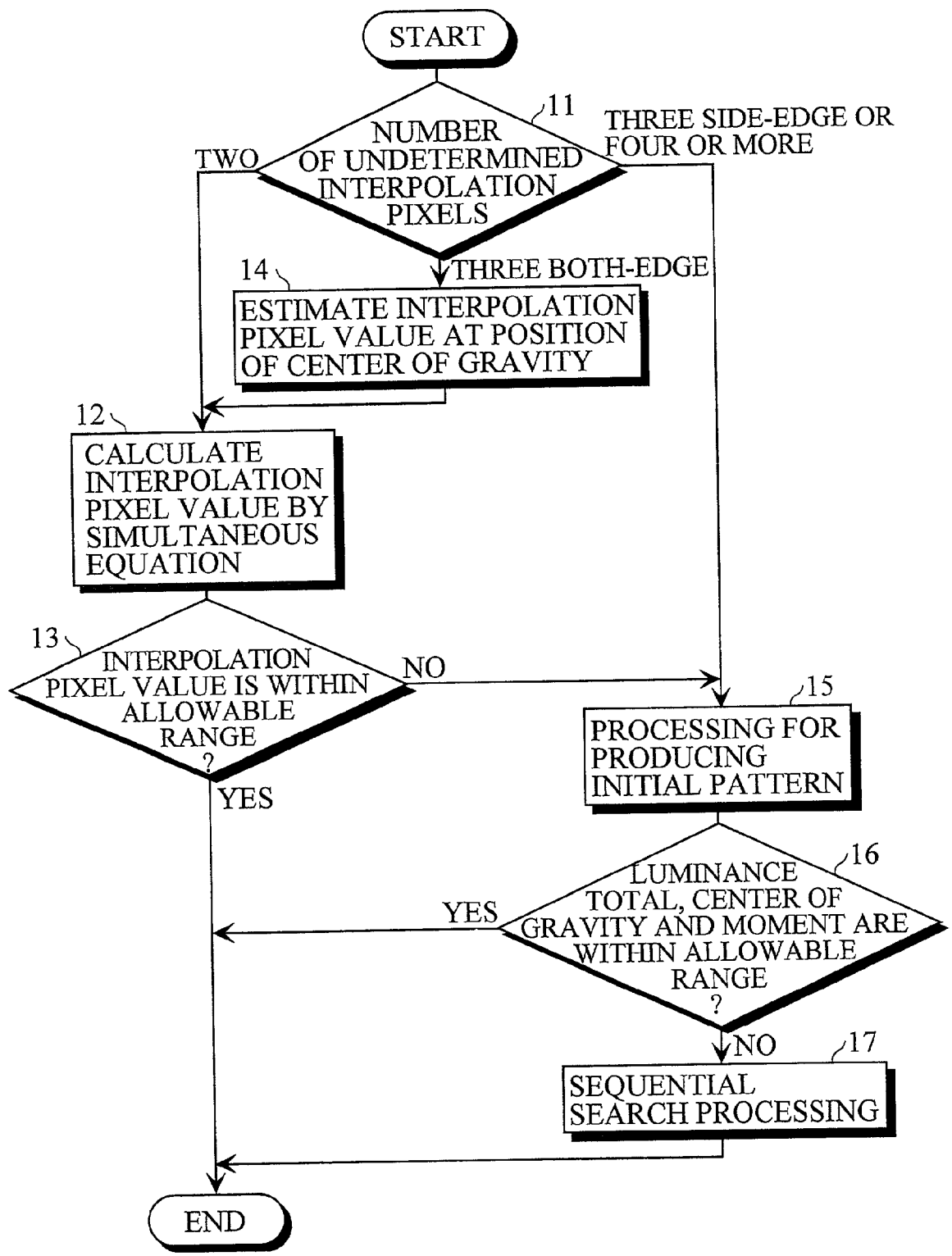
FIG. 17 is a flow chart showing the schematic procedure for processing of a method of determining pixel values in an interpolation unit section which are not determined by strong correlation processing.

FIG. 17 illustrates the schematic procedure for processing of a method of determining a pixel value in an interpolation unit section which is not determined by strong correlation processing.

First, branch processing based on the number of pixels where pixel values are undetermined and the type of edge is performed (step 11).

That is, the method is classified into the following three cases depending on the number of pixels whose pixel values are undetermined and the type of edge:

A case where the number of interpolation pixels whose pixel values are undetermined is two or less A case where the number of interpolation pixels whose pixel values are undetermined is three and the type of edge is a both-edge A case where the number of interpolation pixels whose pixel values are undetermined is three and the type of edge is a side-edge and a case where the number of interpolation pixels whose pixel values are undetermined is four or more Description is now made of each of the cases.

(1) A case where the number of interpolation pixels whose pixel values are undetermined is two or less When the number of interpolation pixels whose pixel values are undetermined is two or less, known values are first substituted in the following equation (7), and a simultaneous equation is solved, thereby finding each of the undetermined interpolation pixel values (step 12). In calculation on a total of three lines, j=2.

$$S_j = \sum_{i=1}^{N} Y_{j,i}$$

$$M_j = \sum_{i=1}^{N} i \times Y_{j,i}$$
(7)

It is then judged whether or not there exists one, exceeding an allowable range (for example, the luminance value is not zero or less), of the found interpolation pixel values (step 13). When there exists none, exceeding the allowable range (for example, the luminance value is not zero or less), of the found interpolation pixel values, the processing is terminated.

When there exists one, exceeding the allowable range (for example, the luminance value is not zero or less), for example), of the found interpolation pixel values, the processing proceeds to the step 15.

(2) A case where the number of interpolation pixels whose pixel values are undetermined is three and the type of edge is a both-edge When the number of interpolation pixels whose pixel values are undetermined is three and the type of edge is a both-edge, a value intermediate between the respective maximum luminance values in the upper and lower reference unit sections is taken as the value of a pixel at which a center of gravity in the interpolation unit section is positioned (step 14). Consequently, the number of interpolation pixels whose pixel values are undetermined is two. The relative x-coordinate of the pixel at which the center of gravity is positioned becomes a value obtained by rounding the value of the center of gravity G in the interpolation unit section to the nearest whole number.

The procedure proceeds to the step 12. In the step 12, the same processing as that in the case where the number of interpolation pixels whose pixel values are undetermined is two or less.

Description is made of processing in a case where the number of interpolation pixels whose pixel values are undetermined is three and the type of edge is a both-edge using the example shown in FIG. 7.

In FIG. 7, a hatched portion indicates an existent line, and an interpolation pixel value in a portion enclosed by a broken line is calculated. When a center of gravity, a luminance total, and a moment on each line, and an interpolation value found by a strong correlation are found by taking a threshold value for strong correlation processing as five, they are as shown in FIG. 18.

Since the type of edge is a both-edge, and the number of interpolation pixels whose pixel values are undetermined is three, the step 14 is applied, to take the luminance value $Y_{2,3}$ at a position corresponding to the center of gravity in the interpolation unit section is taken as an average value of the respective maximum values in the upper and lower reference unit sections. In this example, the center of gravity is 3.38, which is rounded to the nearest whole number, whereby the y-x coordinates of the position corresponding to the center of gravity are (2, 3). The luminance value $Y_{2,3}$ at the position corresponding to the center of gravity is 90.5 $\{=(97+84)/2\}$. When the simultaneous equation is solved, interpolation pixel values as shown in FIG. 19 are obtained.

(3) A case where the number of interpolation pixels whose pixel values are undetermined is three and the type of edge is a side-edge, or a case where the number of interpolation pixels whose pixel values are undetermined is four or more In this case, processing for producing an initial pattern is first performed (step 15).

The initial pattern is produced in the following manner. First, the pixel value in the known reference unit section is copied such that a center of gravity therein coincides with the center of gravity in the interpolation unit section, thereby producing a temporary pixel value pattern in the interpolation pixel section. Since the upper reference unit section and the lower reference unit section exist as the known reference unit section, a temporary pixel value pattern is produced from each of the upper reference unit section and the lower reference unit section.

The temporary luminance total, moment, and center of gravity in the obtained interpolation unit section are found on the basis of the temporary pixel value pattern in the obtained interpolation unit section, thereby taking as an initial pattern the pixel value pattern taking a value closest to the recommended center-of-gravity value in the interpolation unit section found from the center of gravity in the reference unit section (the center of gravity found by the foregoing equation (6)).

In the case of the both-edge, the temporary pixel value pattern includes pixel value patterns obtained by reversing the pixel value in the reference unit section to the right and left centered at the center of gravity in the reference unit section in addition to the temporary pixel value pattern produced by the above-mentioned copying. Therefore, the total number of pixel value patterns is four. The pixels to be copied in the interpolation unit section are limited to undetermined interpolation pixels which are not found by a strong correlation.

The production of the initial pattern will be described more specifically using the example shown in FIG. 7. In the example shown in FIG. 7, a threshold value for strong correlation processing is taken as four, the number of unclear portions is four. In the example shown in FIG. 7, the type of edge is a both-edge.

When the threshold value for strong correlation processing is taken as four, any of the interpolation pixels in the unit section is not determined by strong correlation processing (both ends of an extended unit section are determined). Accordingly, patterns of the luminance values of all four pixels must be found.

Figures 21, 22:
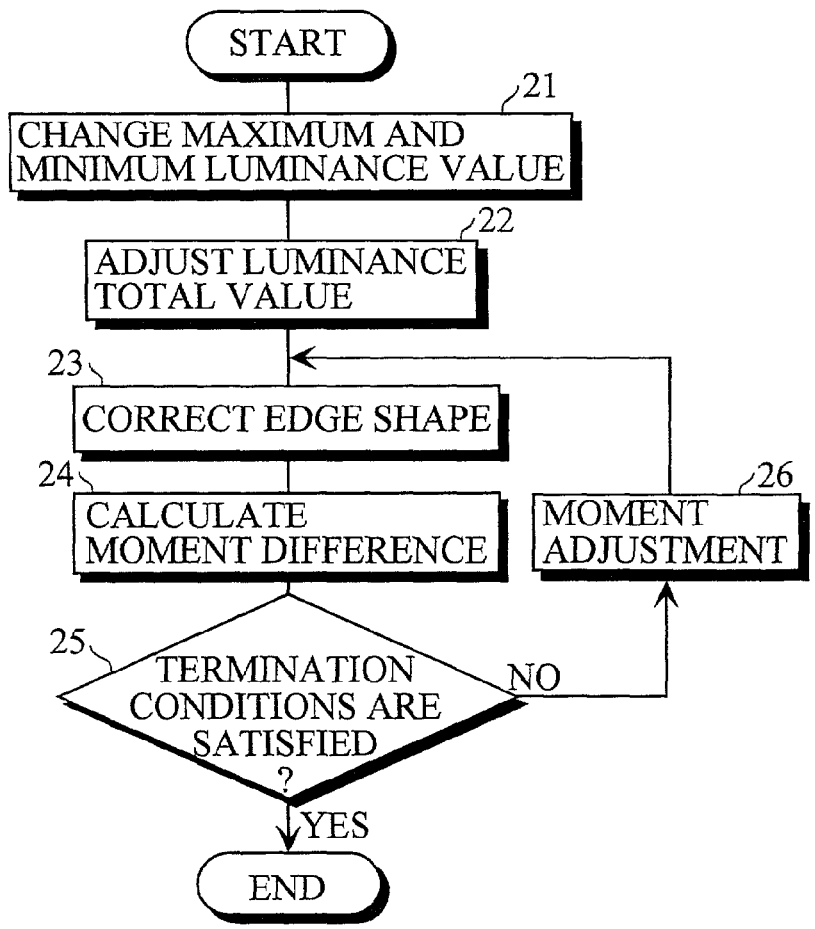
FIG. 21 is a schematic view showing temporary luminance value patterns A', A", B', and B" found from FIG. 20.
FIG. 22 is a flow chart showing the procedure for sequential search processing.

First, a temporary pixel value pattern is produced on the basis of the upper reference unit section. A center of gravity in the upper reference unit section is 4.12. If 4.12 is rounded to the nearest whole number, therefore, x=4. Accordingly, $Y_{1,4}$=97 becomes a center of gravity. The recommended center-of-gravity value in interpolation unit section is an average value 3.38 of the respective centers of gravity in the upper and lower reference unit sections, whereby $Y_{2,3}$ becomes a center of gravity. When $Y_{1,4}$ is shifted by one pixel leftward, therefore, a first temporary luminance value pattern A' is obtained, as shown in FIG. 21. In this example, the edge is a both-edge, thereby producing a second temporary luminance value pattern A" obtained by inverting the first temporary luminance value pattern A' to the right and left centered at $Y_{1,4}$.

Furthermore, when a temporary pixel value pattern is similarly produced on the basis of the lower reference unit section, third and fourth temporary luminance value patterns B' and B" are obtained, as shown in FIG. 21.

From FIG. 21, a center of gravity (3, 40) in the fourth temporary luminance pattern B" out of the centers of gravity in the four temporary luminance value patterns A', A", B', and B" becomes a value closest to the recommended center-of-gravity value in the interpolation unit section (3.38, see FIG. 20) found from the center of gravity in the reference unit section. In this example, a luminance total (156) in the temporary luminance value pattern B" also almost coincides with the recommended luminance total value in the interpolation unit section (156, see FIG. 20) found from the luminance total in the reference unit section. Further, in this example, a moment (530, 0) in the temporary luminance value pattern B" also almost coincides with the recommended moment value in the interpolation unit section (527.8, see FIG. 20) found from the center of gravity and the luminance total in the reference unit section.

When the initial pattern is produced in the step 15, it is judged whether or not the center of gravity, the luminance total, and the moment in the interpolation unit section obtained by the initial pattern almost conform to the recommended center-of-gravity value, the recommended luminance total value, and the recommended moment value in the interpolation unit section which are found from the center of gravity and the luminance total in the known reference unit section (step 16). When the centers of gravity, the luminance totals, and the moments almost conform to the recommended values, respectively, processing is terminated, taking the initial pattern as a pixel value in the interpolation unit section.

When the centers of gravity, the luminance totals, and the moments hardly conform to the recommended values, respectively, sequential search processing is performed by complying with the following restrictions (step 17):

(i) The maximum luminance value in the interpolation unit section does not exceed the maximum luminance in the reference unit section. In the case of the both-edge, it is preferable that the maximum luminance value in the interpolation unit section is determined to a value intermediate between the respective maximum luminance values in both the reference unit sections.

(ii) The minimum luminance value in the interpolation unit section is determined so as to satisfy the minimum luminance value of the interpolation pixel value found by strong correlation processing as much as possible.

(iii) The interpolation pixel value is formed, if both the reference unit sections have a peculiar tendency of a luminance value such that the luminance increases rightward (leftward), and the luminance in the vicinity of the position of the center of gravity reaches a maximum in the unit section, so as to conform to the tendency.

(iv) The interpolation pixel value is found such that the edge width of the interpolation unit section does not greatly change from the respective edge widths of the upper and lower reference unit sections already found.

[3-2] Description of Sequential Search Processing

FIG. 22 shows the procedure for sequential search processing.

In the sequential search processing, the values of pixels in an interpolation unit section are sequentially found such that a luminance total and a center of gravity in the interpolation unit section respectively coincide with the recommended luminance total value and the recommended center-of-gravity value in the interpolation unit section, which are found by respectively averaging the luminance totals and the centers of gravity in the reference unit sections.

In the sequential search processing, a desired interpolation value is obtained by sequentially advancing the following processing from the initial pattern determined in the step 15 shown in FIG. 17.

(1) Step 21: Processing for Adjusting Maximum and Minimum Luminance Values

That is, the minimum luminance value and the maximum luminance value are adjusted so as to satisfy the following restrictions.

(a) A Case of a Side-Edge

Each of interpolation pixel values takes a value between the minimum luminance value and the maximum luminance value of interpolation pixel values at right and left ends found by a strong correlation.

(b) A Case of a Both-Edge Crest Type

The maximum luminance value of the interpolation pixel value is taken as an average value of the respective maximum luminance values in the upper and lower reference unit sections. The minimum luminance value at the left end found by a strong correlation is taken as the minimum luminance value on the left side of the center of gravity. The minimum luminance value at the right end found by a strong correlation is taken as the minimum luminance value on the right side of the center of gravity.

(c) A Case of a Both-Edge Trough Type

The maximum luminance value of the interpolation pixel value is taken as an average value of the respective minimum luminance values in the upper and lower reference unit sections. The minimum luminance value at the left end found by a strong correlation is taken as the maximum luminance value on the left side of the center of gravity. The maximum luminance value at the right end found by a strong correlation is taken as the maximum luminance value on the right side of the center of gravity.

(2) Step 22: Adjustment of Luminance Total Value

That is, the luminance total in the interpolation unit section at the time point where the step 21 is terminated is subtracted from the recommended luminance total value, to find a difference value of the luminance total.

A value obtained by equally dividing the difference value of the luminance total is added to a portion entering an edge width, excluding the interpolation pixel determined by a strong correlation and respective pixels having the minimum luminance value and the maximum luminance value which are detected and set in the step 21, thereby making the luminance total equal to the recommended luminance total value.

(3) Step 23: Correction of Edge Shape

Each of the interpolation pixel values is processed so as to conform to the edge shape such that it forms a gentle slope.

(a) A Case of a Both-Edge Crest Type

The edge shape is corrected such that the luminance value decreases leftward from the pixel having the maximum luminance value positioned in the vicinity of the center of the interpolation unit section.

That is, letting Yi be the maximum luminance value, if $(Y_i-th\_Y)-Y(i-1)$ is positive, excessive luminances are successively brought nearer to an end of the interpolation unit section as $Y(i-1)=Y_i-\{(Y_i-th\_Y)-Y(i-1)\}$ and $Y(i-2)=Y(i-2)+\{(Y_i-th\_Y)-Y(i-1)\}$.

Herein, th_Y is a threshold value for maintaining the slope shape, and takes a value of zero or more. Conversely, the edge shape is corrected such that the luminance value decreases rightward from the pixel having the maximum luminance value positioned in the vicinity of the center of the interpolation unit section.

(b) A Case of a Both-Edge Trough Shape

The edge shape is corrected such that the luminance value increases leftward from the pixel having the minimum luminance value positioned in the vicinity of the center of the interpolation unit section.

That is, letting Yi be the maximum luminance value, if (Yi+th_Y)−Y(i−1) is positive, excessive luminances are successively brought nearer to an end of the interpolation unit section as Y(i−1)=Yi−{(Yi+th_Y)−Y(i−1)} and Y(i−2)= Y(i−2)−{(Yi+th_Y)−Y(i−1)}. Herein, th_Y is a threshold value for maintaining the slope shape, and takes a value of zero or more.

Conversely, the edge shape is corrected such that the luminance value increases rightward from the pixel having the minimum luminance value positioned in the vicinity of the center of the interpolation unit section.

(c) A Case of a Side-Edge

In the case of such a shape that the luminance value decreases leftward from the right, the edge shape is corrected such that the luminance value decreases leftward from the pixel having the maximum luminance value positioned at the right end of the interpolation section.

That is, letting Yi be the maximum luminance value, if (Yi−th_Y)−Y(i−1) is positive, excessive luminances are successively brought nearer to an end of the interpolation unit section as Y(i−1)=Yi−{(Yi−th_Y)−Y(i−1)} and Y(i−2)= Y(i−2)+{(Yi−th_Y)−Y(i−1)}.

Conversely, in the case of such a shape that the luminance value decreases rightward from the left, the edge shape is corrected such that the luminance value decreases rightward from the pixel having the maximum luminance value positioned at the left end of the interpolation unit section.

(4) Step 24: Calculation of Moment Difference A moment in the current interpolation unit section is subtracted from a desired moment M' (=S'×G') in the interpolation unit section, to find a moment difference. If the difference is within an allowable difference, processing is terminated, assuming that the interpolation pixel value is correct. In this step, this processing shall be terminated if it is performed a predetermined number of times with respect to one edge in order to avoid the processing falling into an endless loop.

When termination conditions are satisfied (YES at step 25), the processing is terminated. When the termination conditions are not satisfied (NO at step 25), moment adjustment is made (step 26).

(5) Step 26: Moment Adjustment

In the moment adjustment, the interpolation pixel value is adjusted depending on the moment difference found in the step 24. When the moment difference (=desired moment−current moment) is positive, a luminance on the right side is relatively increased, and a luminance on the left side is relatively decreased.

Conversely, when the moment difference is negative, a luminance on the right side is relatively decreased, and a center of gravity on the right side is relatively increased. The moment is changed so as not to change the luminance total in the interpolation unit section in such a shape that if the value of a certain pixel is increased by one, the value of another pixel is decreased by one.

The amount of change in the moment depends on the difference between relative x-coordinates, as apparent from an equation for calculation (8):

$$\text{Amount of change in moment} = \quad (8)$$
$$\text{left } x\text{-coordinate} \times (-\alpha) + \text{right } x\text{-coordinate} \times \alpha =$$
$$(\text{right } x\text{-coordinate} - \text{left } x\text{-coordinate}) \times \alpha$$

Herein, the right x-coordinate indicates the relative x-coordinate of a pixel, on the relatively right side, whose luminance is to be operated, the left x-coordinate indicates the relative x-coordinate of a pixel, on the relatively left side, whose luminance is to be operated, and α indicates the amount of increase in the luminance of the right x-coordinate. When the luminance value of the right x-coordinate is decreased, therefore, α takes a negative value.

When the first moment is determined using the initial pattern, the difference between the recommended moment value and the current moment is relatively small from the beginning. Therefore, a pixel whose moment is to be changed may be suitably selected at an edge excluding the maximum luminance and the right and left minimum luminances.

The amount of change in the luminance is obtained by the following equation (9) when a pixel to be changed is determined:

$$\text{Luminance value of pixel to be changed} = \quad (9)$$
$$\text{moment difference} / (\text{right } x\text{-coordinate} - \text{left } x\text{-coordinate})$$

When the luminance value of the pixel to be changed does not fall within a range from the maximum luminance to the right and left minimum luminances by the change in luminance value of the pixel to be changed, it is decreased to fall within the range, and the luminance value of the interpolation pixel is then changed.

When the moment adjustment is terminated, the program is returned to the step 23.

[3-3] Description of Example of Conduction of Sequential Search

FIG. 23 illustrates an example of conduction of sequential search. The sequential search processing will be described on the basis of FIG. 23.

In this example, the pixel value pattern A' out of the pixel value patterns shown in FIG. 21 shall be selected as an initial pattern for convenience of illustration.

From FIG. 18, a recommended luminance total value S', a recommended moment value M', and a recommended center-of-gravity value G' are respectively S'=156, M'=528, and G'=3.38. From FIG. 18, the minimum luminance value Ymin is 1. Further, the maximum luminance value Ymax is 90 obtained by rounding down (97+84)/2=90.5.

In this example, the fractions after the decimal point are not used as a luminance value for simplification. Only in this example, the luminance value expressed in each relative x-coordinate is represented by Yx for simplification.

(1) Step 21: Change in Maximum and Minimum Luminance Values

In the change in the maximum value, each Yx is scanned, to take a pixel value which is not less than Ymax as Ymax.

Since the edge shape is a both-edge, Ymax is substituted in a pixel Y3 (3.38+0.5 is rounded down) at which a center of gravity is positioned.

In the change in the minimum value, each Yx is scanned, to take a pixel value which is not more than Ymin as Ymin. In this example, Ymin=1 or less does not exist, no processing is performed.

(2) Step 22: Adjustment of Luminance Total

A luminance total value 150 at the time when the step 21 is terminated is subtracted from the recommended luminance total value S'=156, thereby finding a luminance total difference value 6. A value 3 (6/2) obtained by equally dividing the luminance total difference value 6 is added to pixels Y2 and Y4 excluding interpolation pixels Y1 and Y6 determined by a strong correlation and a pixel Y5 having the minimum luminance value and a pixel value Y3 having the maximum luminance value set in the step 21, thereby making the luminance total value equal to the recommended luminance total value.

(3) Step 23: Correction of Edge Shape

Since the edge shape is a both-edge crest type, the edge shape is corrected such that the luminance value decreases leftward (rightward) from the pixel having the maximum luminance value positioned in the vicinity of the center of the interpolation section. In the both-edge crest type in this example, when th_Y is zero, no excessive luminance is produced. Accordingly, no processing is performed.

(4) Step 24: Calculation of Moment Difference

A moment difference obtained by subtracting the current moment from the recommended moment value M' is 36 (=528−492).

(5) Step 26: Moment Adjustment

The moment is so adjusted as to increase for the pixels Y2 and Y4 which can be changed by a value included in an edge width.

Luminance value to be changed =

$$\text{moment difference}/(\text{right } x\text{-coordinate} - \text{left } x\text{-coordinate}) =$$
$$36/(4-2) = 18$$

Consequently, Y2=21−18=3 and Y4=42+18=60. Any of the pixels falls between the maximum luminance value and the minimum luminance value.

(6) Step 23: Correction of Edge Shape

Since no excessive luminance is produced, no processing is performed.

(7) Step 24: Calculation of Moment Difference

Since a moment difference is zero, the program is terminated.

Although in the above-mentioned embodiment, a center of gravity is found using linear interpolation, the number of unit sections each composed of original pixels may be three or more if the scale of hardware is allowed to be enlarged, a center of gravity in an interpolation unit section may be found by curved interpolation such as spline interpolation using the center of gravity found by each of the unit sections, and an interpolation pixel value in the interpolation unit section may be found so as to conform to the center of gravity. Consequently, a more beautiful shape can be formed.

In the above-mentioned embodiment, in order to produce an image formed by successive scanning from an image formed by interlaced scanning, only a center of gravity on the transverse line is found. However, in scaling processing, centers of gravity in the longitudinal direction to an oblique direction are utilized, thereby making it possible to find an interpolation pixel value.

[4] As to Application to Scaling Processing

A method of applying a G method to scaling processing will be then simply described.

In the above-mentioned G method, each of a center of gravity and a luminance total in an interpolation unit section is calculated as an average value in upper and lower reference unit sections. The reason for this is that the interpolation unit section is positioned in a portion intermediate between the upper and lower unit sections when considered by a y-coordinate.

An interpolation pixel (an interpolation unit section) produced by the scaling processing is not necessarily a point intermediate between the upper and lower reference unit sections. In such a case, a center of gravity $G_2$ and a luminance total $S_2$ in the interpolation unit section can be found by the following equation (10):

$$G_2=(G_1 \times D3 + G_3 \times D1)/(D3+D1)$$

$$S_2=(S_1 \times D3 + S_3 \times D1)/(D3+D1) \qquad (10)$$

Herein, $G_1$ denotes a center of gravity in the upper reference unit section, D1 denotes the distance on a y-coordinate from the interpolation unit section to the upper reference unit section, $S_1$ denotes a luminance total in the upper reference unit section, $G_3$ denotes a center of gravity in the lower reference unit section, D3 denotes the distance on a y-coordinate from the interpolation unit section to the lower reference unit section, and $S_3$ denotes a luminance total in the lower reference unit section.

That is, when the G method is used for the scaling processing, in finding a value belonging to the interpolation unit section from values belonging to the upper and lower unit sections, the value is calculated, coupled with a weight corresponding to the distance. The other processing can be similarly performed.

[B] Description of Second Embodiment

[1] Description of Problem of First Embodiment and Steps Changed in First Embodiment In the first embodiment, in a unit section composed of a plurality of pixels each including an edge, an interpolation value in the edge in converting interlaced scanning into successive scanning (IP conversion) is determined in such a shape that the linearity of a center of gravity and a luminance is maintained.

When the number of undetermined pixels in an interpolation unit section is three or less, however, the pixel values of the undetermined pixels are calculated using an equation. When the number of undetermined pixels in the interpolation unit section is four or more, however, the pixel values of the undetermined pixels are determined by sequential search processing. When the number of undetermined pixels in the interpolation unit section is four or more, therefore, the processing time is lengthened.

Even when the number of undetermined pixels in the interpolation unit section is four or more in the second embodiment, therefore, a method of determining the pixel values of the undetermined pixels in relatively simple processing is proposed. It goes without saying that the method is applicable to a case where the number of undetermined pixels in the interpolation unit section is three or less.

Description is made of the difference between the method according to the first embodiment and the method according to the second embodiment.

Figure 24:
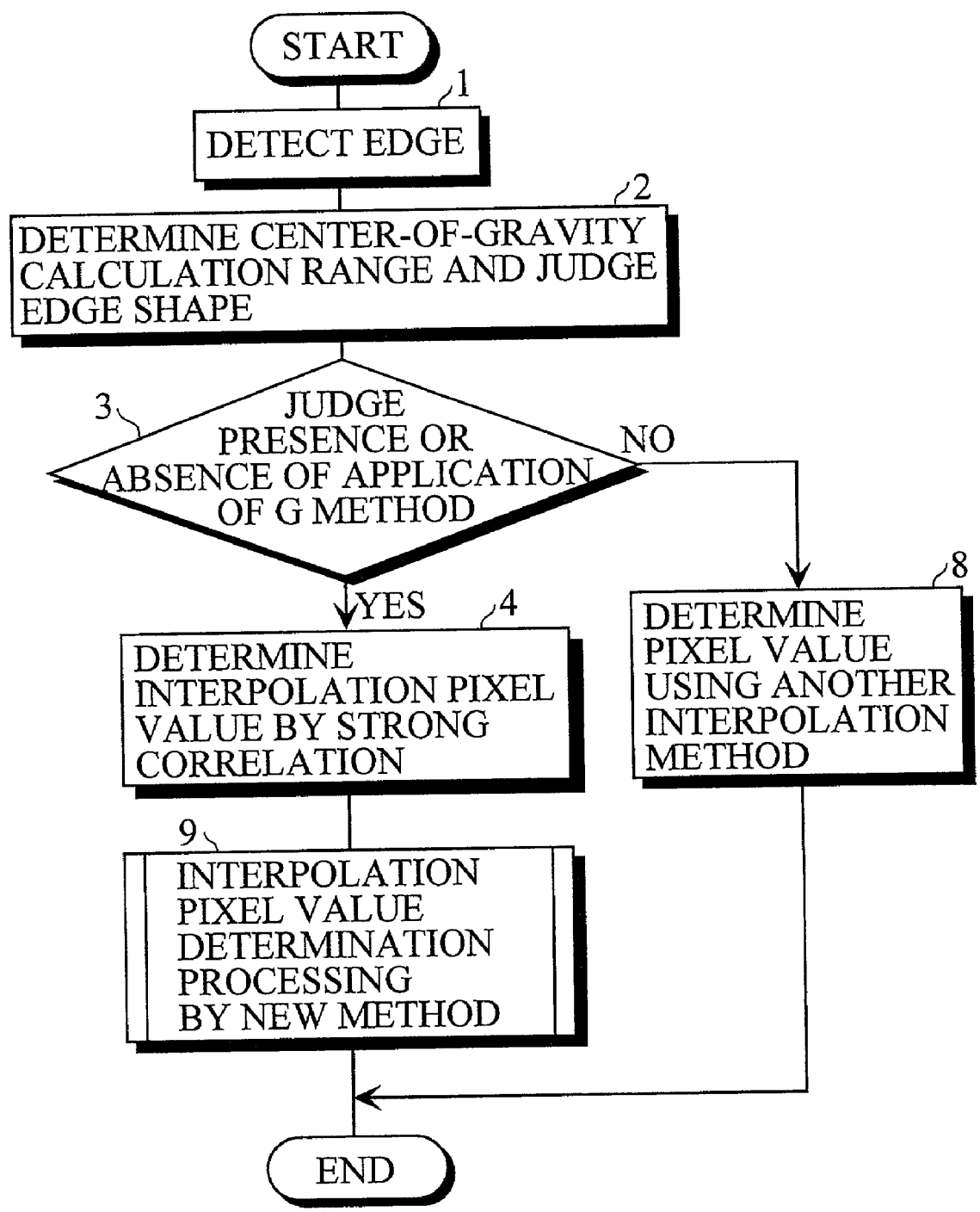
FIG. 24 is a flow chart showing the overall procedure for processing according to a second embodiment.

FIG. 24 shows the procedure for overall processing according to the second embodiment.

In FIG. 24, the same step number is assigned to the same step as that shown in FIG. 5. When the second embodiment and the first embodiment are compared with each other, they differ in processing in the step 4 and the subsequent steps. That is, interpolation pixel value determination processing by a new method in the step 9 is performed after the processing in the step 4.

Figure 25:
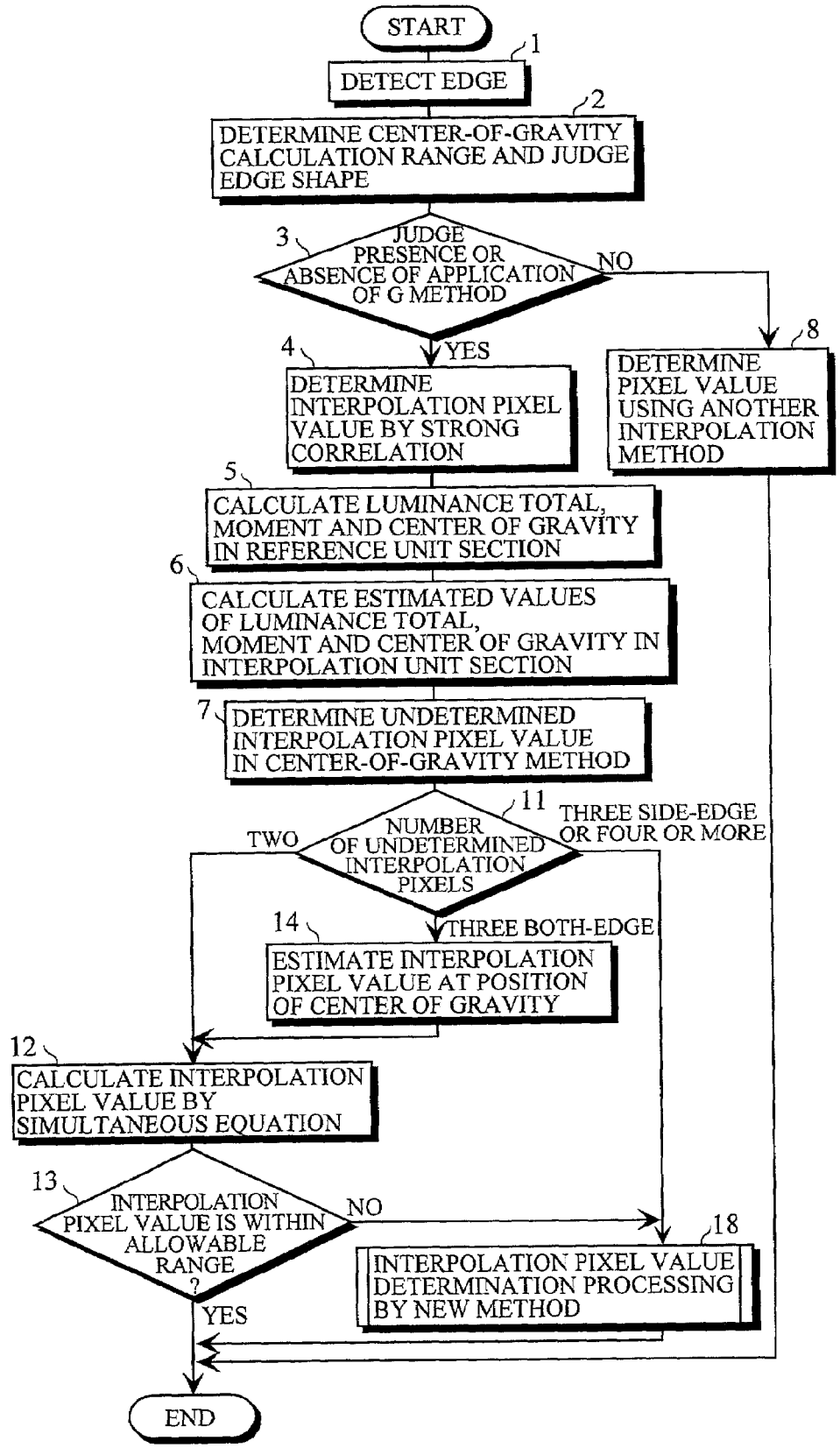
FIG. 25 is a flow chart showing the overall procedure for processing in a case where processing in the steps 15 to 17 shown in FIG. 17 which are parts of the step 7 shown in FIG. 5 is replaced with interpolation pixel value determination processing by a new method shown in the step 18.

As shown in FIG. 25, the processing in the steps 15 to 17 shown in FIG. 17 which are parts of the step 7 shown in FIG. 5 may be replaced with interpolation pixel value determination processing by a new method in the step 18. Since the interpolation pixel value determination processing by a new method in the step 18 is the same as the interpolation pixel value determination processing by a new method in the step 9 shown in FIG. 24, the procedure for processing shown in FIG. 24 will be described below.

When the interpolation pixel value is calculated only using the interpolation pixel value determination processing by a new method without considering the first embodiment, the judgment of the edge shape in the step 2 shown in FIG. 24 need not be made. Similarly, in the step 4 shown in FIG. 24, only a compensation range (a reference unit section) may be set, and the interpolation pixel value need not be calculated.

[2] Description of Fundamental Principle of Interpolation Pixel Value Determination Processing by New Method The fundamental principle of interpolation pixel value determination processing by a new method will be described. Also in the second embodiment, an upper reference unit section, a lower reference unit section, and an interpolation unit section are determined, as in the first embodiment. The upper reference unit section and the lower reference unit section are subjected to linear interpolation (inter-line interpolation) between the upper and lower reference unit sections in a state where the upper and lower reference unit sections are shifted in the horizontal direction such that respective centers of gravity in the horizontal direction in three unit sections coincide with one another, thereby obtaining the pixel value of each of pixels composing the interpolation unit section. Since the x-coordinate of a center of gravity has accuracy below the pixel unit, the inter-line interpolation is performed in consideration of a pixel boundary between the reference unit section and the interpolation unit section.

The principle will be described in more detail using FIGS. 26, 27 and 28.

Figure 26:
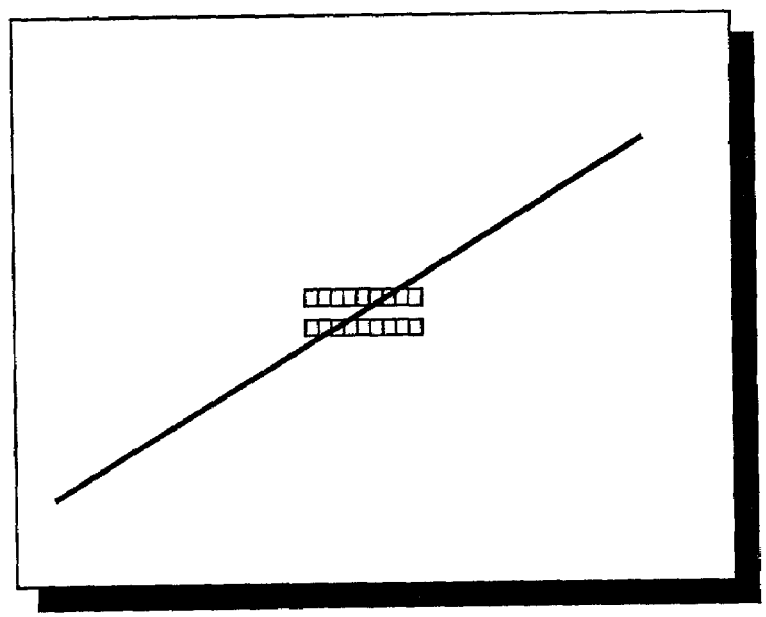
FIG. 26 is a schematic view for explaining the fundamental principle of interpolation pixel value determination processing by a new method, which illustrates upper and lower reference unit sections set such that an edge boundary is interposed therebetween on an original image.

Now suppose an image in which one line is drawn in a white background, as shown in FIG. 26. An edge boundary is detected by an edge detection filter such as a Laplacian conventionally well known, to set the upper and lower reference unit sections such that the edge boundary is interposed therebetween.

Figure 27:
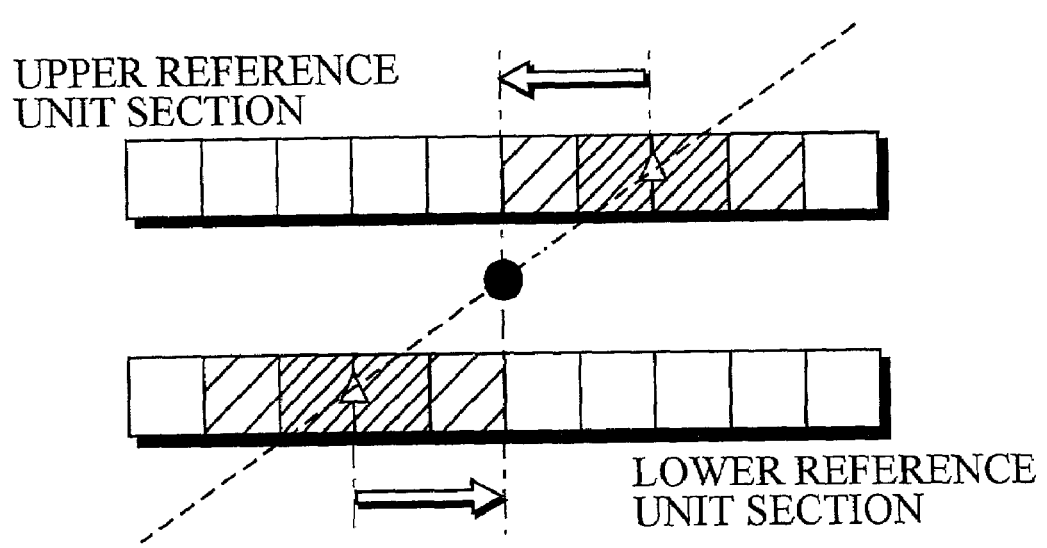
FIG. 27 is a schematic view showing centers of gravity in an upper reference unit section and a lower reference unit section and a center of gravity in an interpolation unit section found by the centers of gravity.

As shown in FIG. 27, a center of gravity (indicated by a Δ mark) in the upper reference unit section and a center of gravity (indicated by a Δ mark) in the lower reference unit section are calculated, to take a point intermediate therebetween as a center of gravity (indicated by a black circle mark) in the interpolation unit section.

Figure 28:
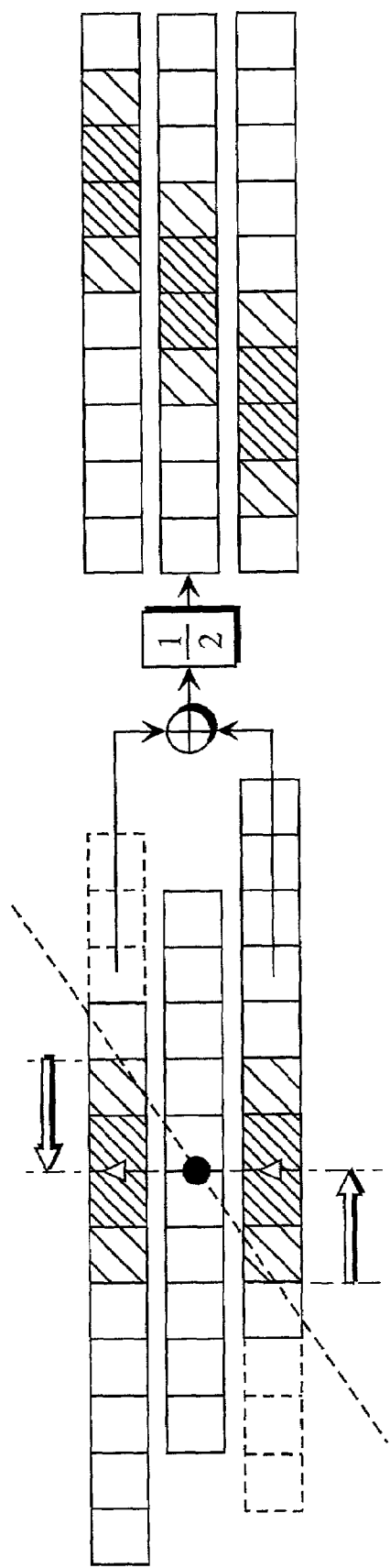
FIG. 28 is a schematic view showing a state where upper and lower reference unit sections are shifted in the horizontal direction such that respective centers of gravity in the upper and lower reference unit sections coincide with a center of gravity in an interpolation unit section.

As shown in FIG. 28, the upper and lower reference unit sections are then shifted in the horizontal direction such that the centers of gravity in the upper and lower reference unit sections respectively coincide with the center of gravity in the interpolation unit section. The upper reference unit section and the lower reference unit section are subjected to linear interpolation, to determine the pixel value of each of the pixels in the interpolation unit section while considering a pixel boundary between the reference unit section and the interpolation unit section in this state. That is, in FIG. 28, the pixel value of each of the pixels in the interpolation unit section becomes an average value between the pixel value of the corresponding (upper) pixel in the upper reference unit section and the pixel value of the corresponding (lower) pixel in the lower reference unit section.

Figure 29:
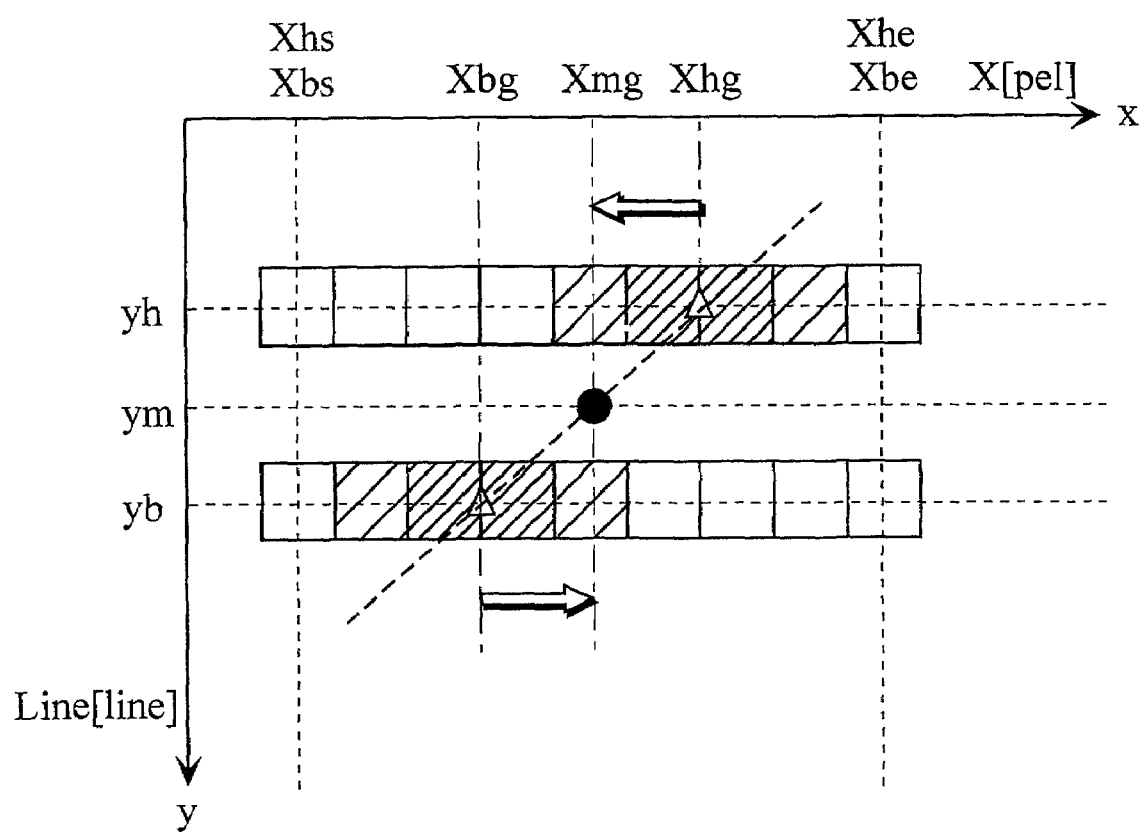
FIG. 29 is a schematic view showing an example of an upper reference unit section and a lower reference unit section.

[3] Description of Procedure for Interpolation Pixel Value Determination Processing by New Method Second interpolation pixel value determination processing will be more specifically described by taking FIG. 29 as an example. FIG. 29 illustrates an upper reference unit section and a lower reference unit section which correspond to an edge different from that shown in FIG. 27.

The definitions of variables in FIG. 29 are as follows:

yh: y-coordinate of upper reference unit section ym: y-coordinate of interpolation unit section (ym=yh+1)

yb: y-coordinate of lower reference unit section (yb=ym+1)

Xhs: x-coordinate of pixel at left end of upper reference unit section

Xhe: x-coordinate of pixel at right end of upper reference unit section

Xbs: x-coordinate of pixel at left end of lower reference unit section

Xbe: x-coordinate of pixel at right end of lower reference unit section

Xhg: x-coordinate of center of gravity in upper reference unit section

Xmg: x-coordinate of center of gravity in interpolation unit section

Xbg: x-coordinate of center of gravity in lower reference unit section

L[x, y]: pixel value expressed in coordinates (x, y)

Although the pixel value expressed in the coordinates (x, y) is indicated by $Y_{y,x}$ in the first embodiment, it shall be indicated by L[x, y] in the second embodiment. Further, the respective x-coordinates Xhg, Xmg, and Xbg of the centers of gravity shall have accuracy below a pixel unit.

In the step where the reference unit section is determined by edge detection, yh, ym, yb, Xhs, Xhe, Xbs, and Xbe shall be determined. Further, the numbers of pixels respectively composing the upper reference unit section and the lower reference unit section shall be equal to each other. That is, (Xhe−Xhs)=(Xbe−Xbs).

Letting Xms be the x-coordinate of the pixel at the left end of the interpolation unit section, and Xme be the x-coordinate of the pixel at the right end of the interpolation reference unit section, Xms and Xme are found by the following equation (11):

$$Xms = \text{Min}(Xhs, Xbs)$$

$$Xme = \text{Max}(Xhe, Xbe) \quad (11)$$

The x-coordinate Xhg of the center of gravity in the upper reference unit section and the x-coordinate Xbg of the center of gravity in the lower reference unit section are found by the following equation (12):

$$Xhg = Xhs + \left\{ \frac{\sum_{i=Xhs}^{Xhe} (i - Xhs + 1) \times L'[i, yh]}{\sum_{i=Xhs}^{Xhe} L'[i, yh]} - 1 \right\} \quad (12)$$

-continued $$Xbg = Xbs + \left\{ \frac{\sum_{i=Xbs}^{Xbe} (i - Xbs + 1) \times L'[i, yb]}{\sum_{i=Xbs}^{Xbe} L'[i, yb]} - 1 \right\}$$

In the foregoing equation (12), L'[x, y] indicates the absolute value of a value obtained by performing filtering processing using a differential filter (1, −1) in the horizontal direction (an output of the result of edge extraction), as expressed by the following equation (13):

$$L'[x, y]=|L[x,y]-L[x-1,y]| \quad (13)$$

The x-coordinate (Xmg) of the center of gravity in the interpolation unit section is found on the basis of the following equation (14):

$$Xmg=(Xhg+Xbg)\div 2 \quad (14)$$

An amount of shift ΔXg between the reference unit sections is found on the basis of the following equation (15)

$$\Delta Xg=(Xbg-Xhg)\div 2 \quad (15)$$

The pixel value of each of the pixels included in the interpolation unit section is found by linear interpolation between the upper reference unit section and the lower reference unit section after shifting the upper reference unit section by ΔXg in the horizontal direction and shifting the lower reference unit section by −ΔXg in the horizontal direction. The value of the interpolation pixel becomes an average value between the pixel value of the corresponding (upper) pixel in the upper reference unit section and the pixel value of the corresponding (lower) pixel in the lower reference unit section, as shown in FIG. 28, described above, when ΔXg is an integer.

When ΔXg is not an integer, as shown in FIG. 29, however, the boundary between the pixels in the interpolation unit section must be considered.

Figure 30:
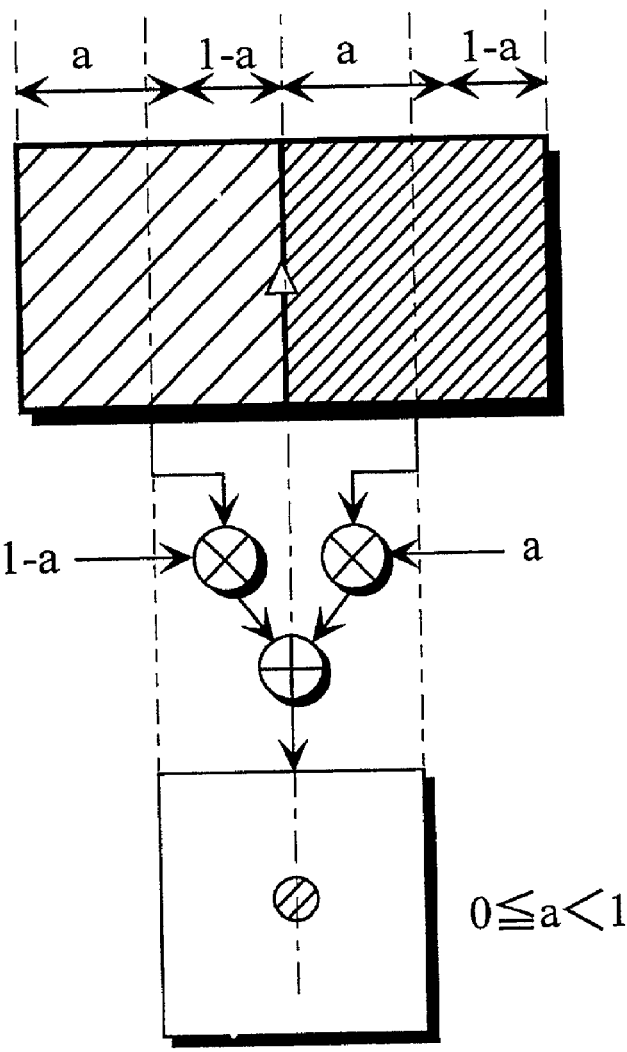
FIG. 30 is a partial enlarged view showing one pixel at which there exists a center of gravity in an interpolation unit section and a portion, positioned above a center of gravity, in an interpolation unit section in an upper reference unit section after the upper reference unit section is shifted by $\Delta Xg$ in FIG. 29.

FIG. 30 illustrates one pixel positioned at the center of gravity in the interpolation unit section and a portion, positioned above the center of gravity in the interpolation unit section, in the upper reference unit section after shifting the upper reference unit section shown in FIG. 29 by ΔXg.

In FIG. 30, the boundary between pixels in the interpolation unit section is spaced a (0≦a≦1 [pel]) apart from the boundary between pixels in the upper reference unit section. In order to find the pixel value of the interpolation pixel corresponding to the upper reference unit section, therefore, the pixel values of the two pixels in the upper reference unit section which are positioned just above the interpolation pixel must be added to each other in the ratio of their areas corresponding to the interpolation pixel.

That is, a value obtained by adding the pixel value of the pixel on the left side of the upper reference unit section shown in FIG. 30 times (1−a) and the pixel value of the pixel on the right side of the upper reference unit section shown in FIG. 30 times a together becomes a pixel value, in the upper reference unit section, corresponding to the interpolation pixel. The same is true for a case where a pixel value, in the lower reference unit section, corresponding to the interpolation pixel.

The pixel value in the upper reference unit section corresponding to the interpolation pixel (a first estimated value of the interpolation pixel in claims 4 and 5), which is thus calculated, is defined as "an interpolation section pixel value estimated from an upper reference unit section, and is indicated by Lh [x, ym]". Further, the pixel value in the lower reference unit section corresponding to the interpolation pixel (a second estimated value of the interpolation pixel in claims 4 and 5), which is calculated in the same method, is defined as "an interpolation section pixel value estimated from a lower reference unit section", and is indicated by Lb [x, ym]. Lh[x, ym] and Lb[x, ym] are found on the basis of the following equation (16):

$$Lh[x, ym] = L[INT(x - \Delta Xg), yh] \times \{1 - FMOD(\text{Wide} - \Delta Xg, 1)\} + \quad (16)$$
$$L[INT(x - \Delta Xg) + 1, yh] \times FMOD(\text{Wide} - \Delta Xg, 1)$$
$$Lb[x, ym] = L[INT(x + \Delta Xg), yb] \times \{1 - FMOD(\text{Wide} + \Delta Xg, 1)\} +$$
$$L[INT(x + \Delta Xg) + 1, yb] \times FMOD(\text{Wide} + \Delta Xg, 1)$$

In the foregoing equation (16), INT(x) is a function for changing x into an integer, FMOD(i, j) indicates a remainder (a remainder which is a real number) in dividing a positive real number i by a positive integer j. That is, FMOD(i, j)=MOD(INT(i×fact), INT (j×fact))÷fact, where fact is a positive integral value for controlling the number of digits after the decimal point. Wide is a positive integral value which is sufficiently large in order that i in FMOD(i, j) is not negative.

When Wide=1000 and ΔXg=−0.4, for example, FMOD (Wide+ΔXg, 1)=FMOD (1000−0.4, 1)=FMOD (999.6, 1)=0.6.

Although it is considered that either one of Lh [x, ym] and Lb [x, ym] found by the foregoing equation (16) can be used as the pixel value L [x, ym] of an interpolation pixel, an average value of both the values is used herein, as expressed by the following equation (17):

$$L[x,ym]=(Lh[x,ym]+Lb[x,ym])\div 2 \quad (17)$$

Figure 31:
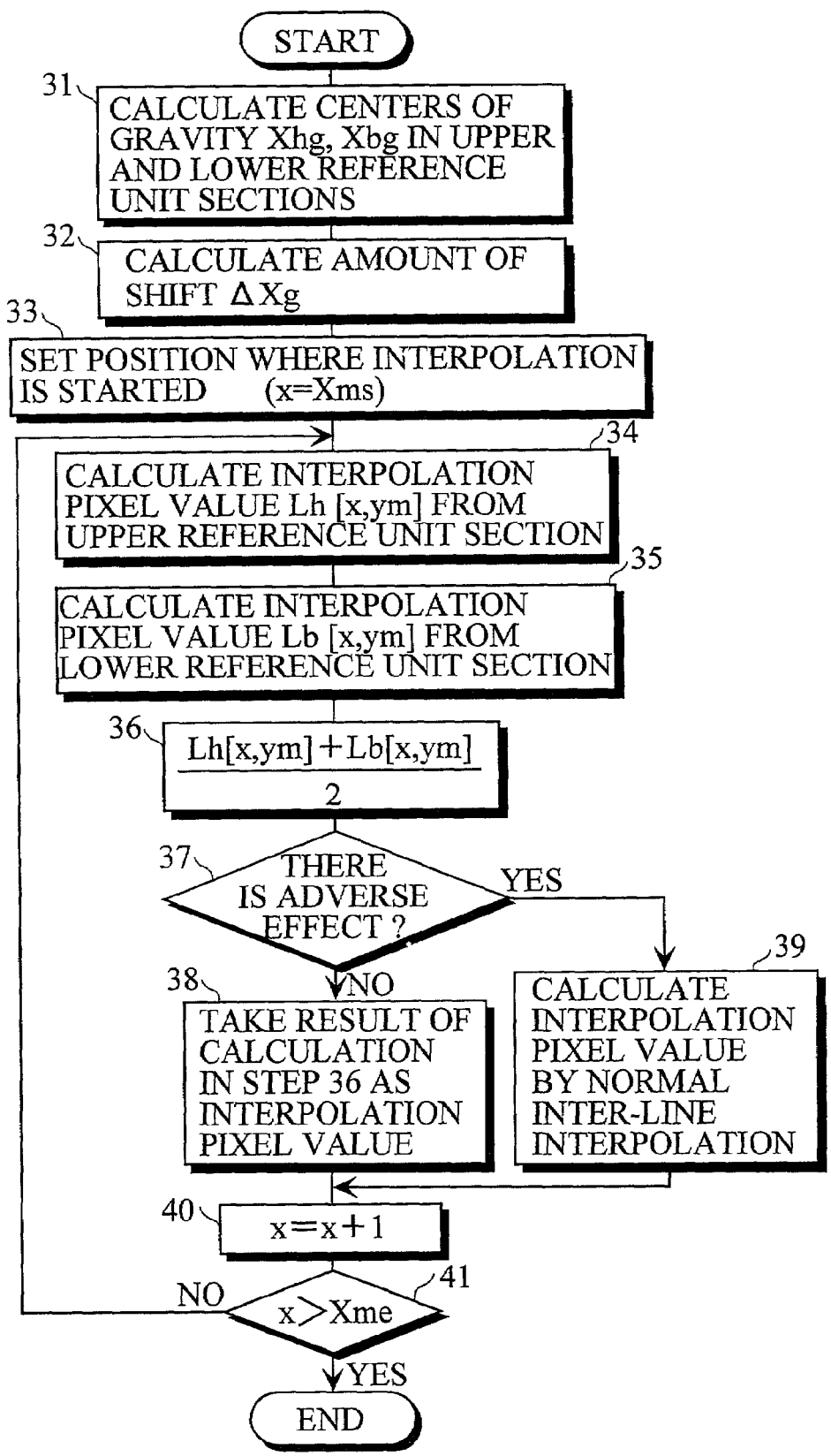
FIG. 31 is a flow chart showing the procedure for interpolation pixel value determination processing by a new method.

FIG. 31 shows the procedure for the interpolation pixel value determination processing by a new method.

Centers of gravity in upper and lower reference unit sections are first found (step 31). That is, an x-coordinate Xhg of the center of gravity in the upper reference unit section and an x-coordinate Xbg of the center of gravity in the lower reference unit section are found on the basis of the foregoing equation (12).

An amount of shift ΔXg between the reference unit sections is then found (step 32). That is, the amount of shift ΔXg is found on the basis of the foregoing equation (15).

The position where interpolation is started is then set (step 33). That is, x=Xms.

An interpolation pixel value Lh [x, ym] estimated from the upper reference unit section and an interpolation pixel value Lb [x, ym] estimated from the lower reference unit section are then calculated on the basis of the foregoing equation (16) (steps 34 and 35).

An average value of Lh [x, ym] and Lb [x, ym] is then calculated (step 36). It is judged whether or not there is an adverse effect (step 37). The details of this processing will be described later.

When there is no adverse effect, the result of the calculation in the step 36 is taken as the pixel value of an interpolation pixel L(x, ym) (step 38), after which the program proceeds to the step 40. When there is an adverse effect, the pixel value of the interpolation pixel L(x, ym) is found by normal inter-line interpolation (step 39). That is, the pixel value of the interpolation pixel L(x, ym) is found on the basis of the foregoing equation (18). The program proceeds to the step 40.

$$L[x,ym]=(L[x,ym-1]+L[x,ym+1])\div 2 \quad (18)$$

In the step 40, the interpolation pixel whose pixel value is to be found is changed. That is, x is incremented by one. It is judged whether or not x after updating is larger than Xme (step 41). When x after updating is not more than Xme, the program is returned to the steps 34 and 35. When x after updating is larger than Xme, the program is terminated.

Description is made of the processing in the foregoing step 37. When the positions where the upper reference unit section and the lower reference unit section are respectively set are erroneous, a value in the interpolation unit section is greatly shifted from an ideal value. As a result, an adverse effect appears on an image.

In the second embodiment, when the upper and lower reference unit sections are correctly set, the interpolation pixel value Lh[x, ym] estimated from the upper reference unit section and the corresponding interpolation pixel value Lb[x, ym] estimated from the lower reference unit section are close values. Actually, a certain degree of difference exists between values respectively taken by Lh[x, ym] and Lb[x, ym] corresponding thereto due to various factors such as the slight shift in the set position, the effect of noise, and further the fact that an edge is not a straight line. Accordingly, the values may be compensated for using their average value only in a section satisfying the following equation (19) in consideration of the difference:

$$|Lh[x, ym]-Lb[x, ym]|<th \quad (19)$$

Herein, th denotes a threshold value for defining a difference, which can be compensated for, between Lh[x, ym] and Lb[x, ym], and may be a variable value as indicated by the following equation (20), for example:

$$th=\text{Max}(Lh[x, ym],Lb[x, ym]) \quad (20)$$

In the foregoing step 37, only an adverse effect which can be clearly recognized by a viewer is eliminated, to judge whether or not the difference between Lh[x, ym] and Lb[x, ym] satisfies the conditions expressed by the foregoing equation (19) every time Lh[x, ym] and Lb[x, ym] corresponding to one pixel in the interpolation unit section and their average value are calculated. When the difference does not satisfy the conditions expressed by the foregoing equation (19), it is judged that there is an adverse effect, to find the pixel value of an interpolation pixel L (x, ym) by normal inter-line interpolation, as expressed by the foregoing equation (18).

[4] Description of Modified Example of Interpolation Pixel Value Determination Processing by New Method Description is made of a modified example of the interpolation pixel value determination processing by a new method.

Although the procedure for processing becomes slightly complicated, Lh[x, ym], Lb[x, ym] and L[x, ym] calculated in the steps 34 to 36 shown in FIG. 31 are found over the entire unit section, centers of gravity Gmg' may be respectively found with respect to a section indicated by Lh[x, ym] (a first virtual interpolation unit section), a section indicated by Lb[x, ym] (a second virtual interpolation unit section), and a section indicated by L[x, ym] (a third virtual interpolation unit section), and each of pixel values in the section, closest to an ideal center of gravity in the interpolation unit section, out of the sections may be taken as each pixel value in the interpolation unit section.

That is, using the following equation (21) for calculating a center of gravity in the unit section, a center of gravity in the interpolation unit section estimated from the upper reference unit section calculated using Lh[x, ym] as L[i, ym] in the equation (21), a center of gravity in the interpolation unit section estimated from the lower reference unit section calculated using Lb[x, ym] as L[i, ym] in the equation (21), and a center of gravity in the interpolation unit section estimated from the upper and lower reference unit sections calculated using L[x, ym] as L[i, ym] in the equation (21) are compared with one another. Each pixel value in the unit section, closest to an ideal center of gravity Gmg in the interpolation unit section, in which a center of gravity is calculated by the following equation (22) is taken as each pixel value in the interpolation unit section:

$$Gmg' = Xms + \left\{ \frac{\sum_{i=Xms}^{Xme}(i-Xms+1)\times L[i, ym]}{\sum_{i=Xms}^{Xme} L[i, ym]} - 1 \right\} \quad (21)$$

$$Gmg = (Ghg + Gbg)\div 2 \quad (22)$$

$$Ghg = Xhs + \left\{ \frac{\sum_{i=Xhs}^{Xhe}(i-Xhs+1)\times L[i, yh]}{\sum_{i=Xhs}^{Xhe} L[i, yh]} - 1 \right\}$$

$$Gbg = Xbs + \left\{ \frac{\sum_{i=Xbs}^{Xbe}(i-Xbs+1)\times L[i, yb]}{\sum_{i=Xbs}^{Xbe} L[i, yb]} - 1 \right\}$$

As expressed by the foregoing equation (22), the ideal center of gravity Gmg in the interpolation unit section is calculated from the center of gravity Ghg calculated from the upper reference unit section and the center of gravity Gbg calculated from the lower reference unit section which are calculated as in the step 5 shown in FIG. 5 in the first embodiment. Although in the present embodiment, one of the first to third virtual interpolation unit sections is selected on the basis of the linearity of the center of gravity, a moment utilized for calculating the center of gravity has linearity. Accordingly, one of the first to third virtual interpolation unit sections may be selected on the basis of the moment.

Figure 32:
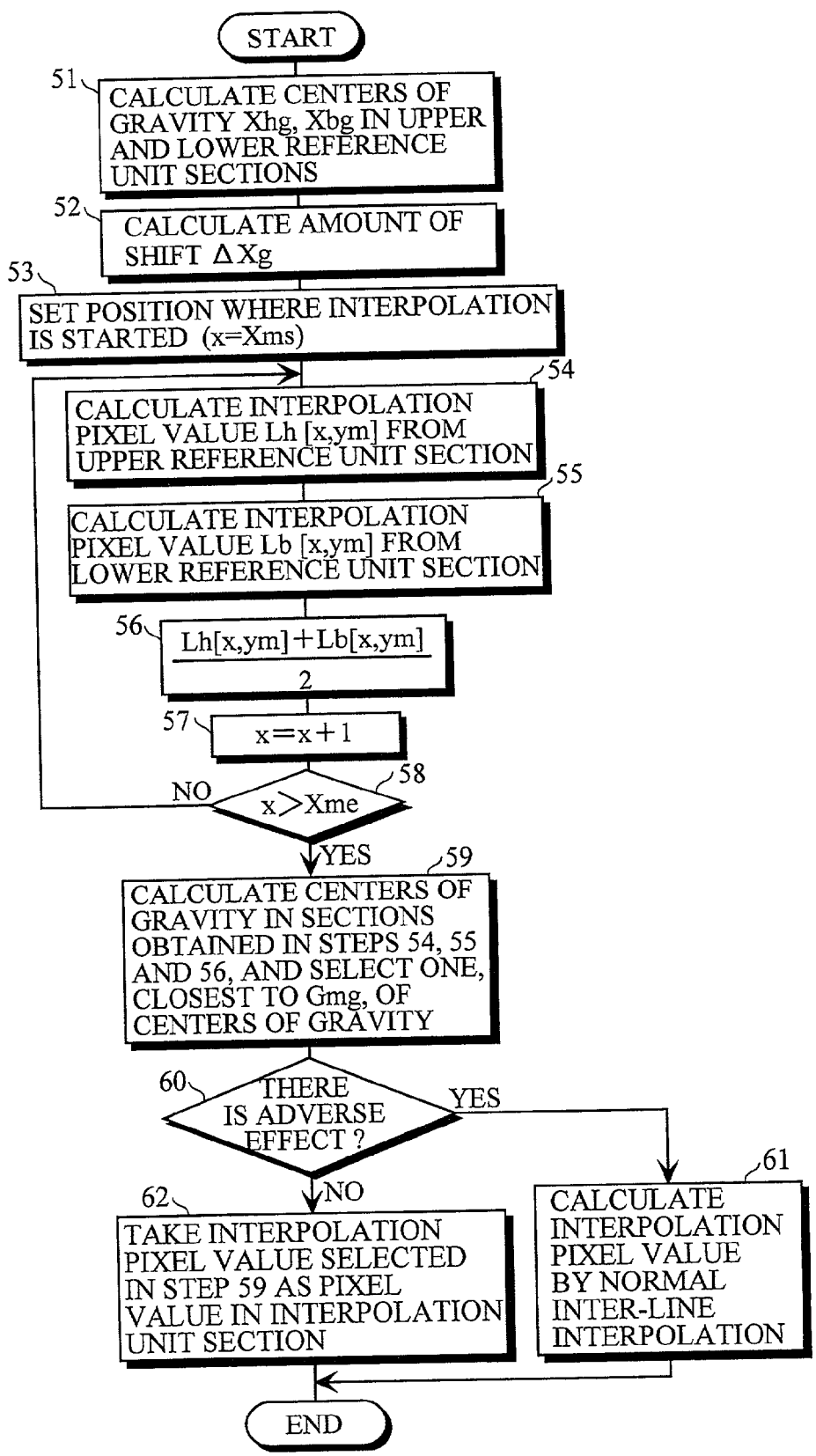
FIG. 32 is a flow chart showing the procedure for processing in a modified example of interpolation pixel value determination processing by a new method.

FIG. 32 shows the procedure for processing in the modified example of the interpolation pixel value determination processing by a new method.

First, centers of gravity in upper and lower reference unit sections are first found (step 51). That is, an x-coordinate Xhg of the center of gravity in the upper reference unit section and an x-coordinate Xbg of the center of gravity in the lower reference unit section are found on the basis of the foregoing equation (12).

An amount of shift ΔXg between the reference unit sections is then found (step 52). That is, the amount of shift ΔXg is found on the basis of the foregoing equation (15).

The position where interpolation is started is then set (step 53). That is, x=Xms.

An interpolation pixel value Lh[x, ym] estimated from the upper reference unit section and an interpolation pixel value Lb[x, ym] estimated from the lower reference unit section are then calculated on the basis of the foregoing equation (16) (steps 54 and 55).

An average value of Lh[x, ym] and Lb[x, ym] is then calculated (step 56). The interpolation pixel whose pixel value is to be found is changed (step 57). That is, x is incremented by one. It is judged whether or not x after updating is larger than Xme (step 58). When x after updating is not more than Xme, the program is returned to the steps 54 and 55.

When x after updating is larger than Xme, a center of gravity Gmg' is found with respect to each of a section indicated by Lh[x, ym], a section indicated by Lb[x, ym], and a section indicated by L[x, ym], and each of pixel values in the section, closest to an ideal center of gravity Gmg in the interpolation unit section, out of the sections may be selected as each pixel value in the interpolation unit section (step 59).

It is then judged whether or not there is an adverse effect (step 60). That is, it is judged whether or not there exists at least one, which does not satisfy the conditions {|Lh[x, ym]−Lb[x, ym]|<th} in the foregoing equation (19), of the interpolation pixel values selected in the step 59.

When there exists at least one, which does not satisfy the conditions expressed by the foregoing equation (19), of the interpolation pixel values selected in the step 59, the pixel values of all pixels in the interpolation unit section are calculated by normal inter-line interpolation (the foregoing equation (18)) (step 61). The processing is terminated.

When there is none, which does not satisfy the conditions expressed by the foregoing equation (19), of the interpolation pixel values selected in the step 59, the interpolation pixel value selected in the foregoing step 59 is taken as a pixel value in the interpolation unit section (step 62). The processing is terminated.

It may be judged in the foregoing manner whether or not there is an adverse effect in the foregoing step 60. That is, it is judged whether or not the absolute value of the difference between the center of gravity Gmg' closest to the ideal center of gravity Gmg in the interpolation unit section and the ideal center of gravity Gmg in the interpolation unit section out of the centers of gravity Gmg' in the section indicated by Lh[x, ym], the section indicated by Lb[x, ym], and the section indicated by L[x, ym] is not more than a predetermined value, and it is judged that there is an adverse effect when the difference is not less than the predetermined value.

[5] Supplementary Description of Calculation of Center of Gravity in Unit Section In the interpolation pixel value determination processing by a new method, the center of gravity in each of the upper and lower reference unit sections has a function serving as a scale for measuring the continuity of an edge and the function of calculating the amount of shift between the upper and lower reference unit sections.

From the point of view of measuring the continuity of the edge, a center of gravity calculated from a pixel value L[x, y] included in the edge is calculated. For the pixel value L[x, y], not only a luminance value but also color difference signals R-Y and B-Y and R, G, and B signals may be used. Similarly, pixel values obtained in subjecting an input image to filtering processing using various types of filters (LPF, BPF, HPF) may be used. A pixel value L'[x, y] obtained in an edge extraction filter as expressed by the foregoing equation (13) may be used as L[x, y]. In short, the continuity of the edge may be preserved in any shape in the upper and lower reference unit sections.

The minimum value of luminances included in the upper and lower reference unit sections is taken as Lmin, for example, to find a value L"[x, y] obtained by subtracting Lmin from the value L[x, y] of each of pixels in the upper and lower reference unit sections, and L"[x, y] is substituted in the foregoing equation (22) as a pixel value L[x, y], to calculate a center of gravity Ghg in the upper reference unit section and a center of gravity Gbg in the lower reference unit section.

The foregoing Lmin and the foregoing L"[x, y] are respectively expressed by the following equations (23) and (24):

$$Lmin = Min(L[Xhs, yh], L[Xhs+1, yh], \ldots, L[Xhe, yh],$$
$$L[Xbs, yb], L[Xbs+1, yb], \ldots, L[Xbe, yb]) \quad (23)$$

$$L''[x,y] = L[x,y] - Lmin \quad (24)$$

It is preferable that used as a pixel value used for calculating a center of gravity used as a scale for measuring the continuity of an edge is one having the same attribute as that of the interpolation pixel value. That is, it is preferable to use, when the interpolation pixel value to be found is a luminance, the luminance for calculating a center of gravity, while using, when the interpolation pixel value is a G signal, the G signal for calculating a center of gravity.

Although in the present embodiment, the center of gravity is used as the scale for measuring the continuity of the edge, a moment may be used as the scale for measuring the continuity of the edge in order to simplify processing. An amount of shift between the upper and lower reference unit sections must be calculated using a center of gravity, and the amount of shift cannot be calculated from a moment.

When the amount of shift between the upper and lower reference unit sections is calculated, the respective centers of gravity in the upper and lower reference unit sections are calculated using an absolute value of a value obtained by filtering processing using a differential filter (1, −1) in the horizontal direction (an output of an edge extraction filter) L'[x,y], as expressed by the equations (12) and (13) in the second embodiment. The reason for this is that when the value after the edge extraction is used, good characteristics are obtained in a side-edge, although they are inferior in a noise-resistant manner to those in a case where the luminance itself is used.

That is, in a case where the luminance is used for calculating the center of gravity in the side-edge, when the respective x-coordinates of starting points or ending points of the upper and lower reference unit sections are set to the same value, as shown in FIG. 29, the difference between the ratio of an object to a background included in the upper reference unit section and the ratio of an object to a background included in the lower reference unit section is increased as the direction of the inclination of the edge comes near to the horizontal direction. As a result, it becomes difficult to calculate a correct amount of shift. The result of the edge extraction is used for calculating the center of gravity so that an edge component of the object enters the upper reference unit section and the lower reference unit section in an equal ratio, thereby calculating the amount of shift more accurately.

In order to reduce the circuit scale, the centers of gravity Xhg and Xbg in the upper and lower reference unit sections used for finding the amount of shift Xg may be found not merely from the result of the edge extraction but from the luminance value. That is, Xhg and Xbg may be calculated on the basis of the foregoing equation (22) in place of the foregoing equation (12). Further, as a pixel value L[x, y]

used for calculating the centers of gravity Xhg and Xbg used for finding the amount of shift Xg, color difference signals (R-Y and B-Y) and R, G, and B signals may be used in addition to the luminance value. Further, L"[x, y] in the equation (24) and the result of output of an FIR (Finite Impulse Response Filter) may be used.

Figure 33:
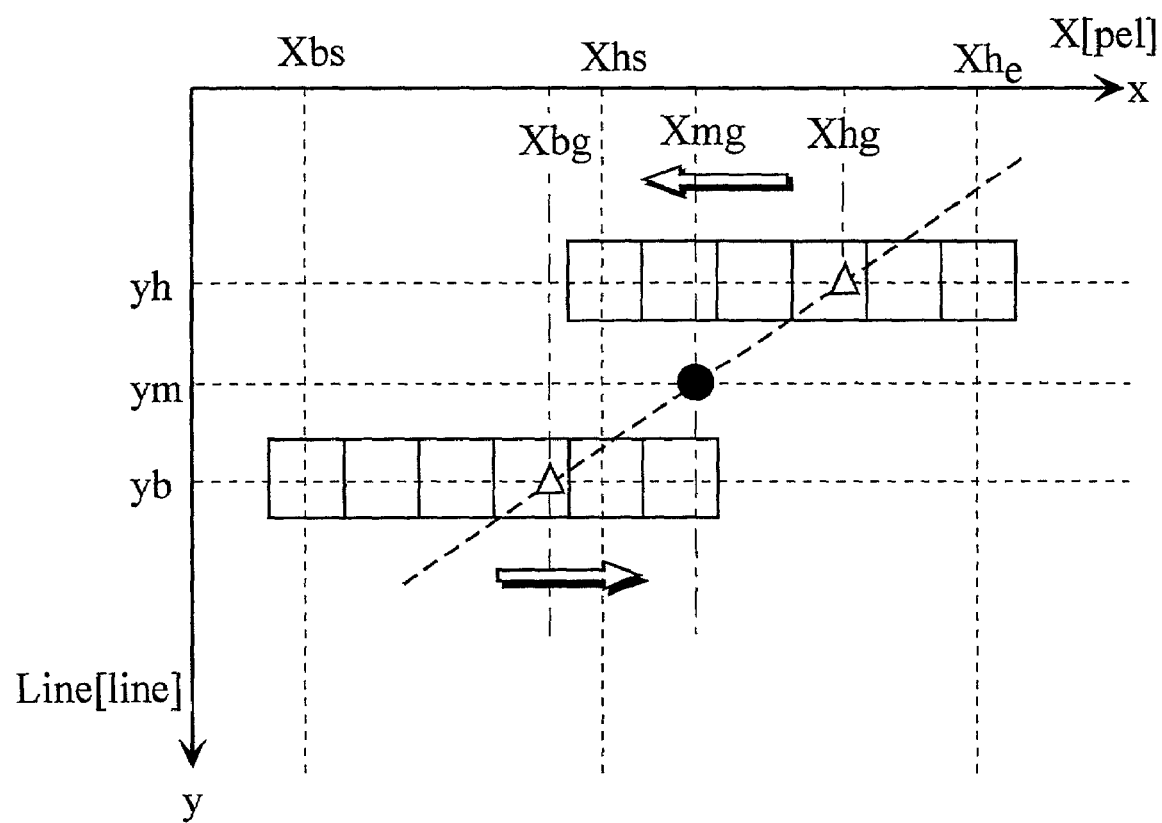
FIG. 33 is a schematic view showing a method of setting a unit section along an edge of an object.

Table 4 and Table 5 respectively show comparative examples in a case where the centers of gravity Xhg and Xbg in the upper and lower reference unit sections used for finding the amount of shift Xg are found from the luminance value and a case where they are found from the result of the edge extraction.

section in an equal ratio, it can be said that an amount of shift can be calculated with such accuracy that a pixel value such as a luminance may be safely used in practice. That is, a unit section may be set along the edge in the object, as shown in FIG. 33. Even when a unit section is set in such a method, the procedure other than the setting of the unit section may be the same as the above-mentioned procedure.

Description is made of the procedure for setting in a case where the unit section is set along the edge in the object, as shown in FIG. 33.

First, a difference value ($=L[x,y]-L[x+1,y]$) from an adjacent pixel in the horizontal direction is found for each

TABLE 4 center of gravity by luminance value [x, y]

| | x-coordinate | | | | | | | on each line | | |
|---|---|---|---|---|---|---|---|---|---|---|
| | 1 | 2 | 3 | 4 | 5 | 6 | 7 | luminance total | moment | center of gravity |
| y-coordinate | | | | | | | | | | |
| 1 | 1 | 5 | 70 | 100 | 90 | 5 | 1 | 271 | 1101.0 | 4.06 |
| 2 | | | | | | | | 271 | 1047.5 | 3.87 |
| 3 | 1 | 20 | 99 | 100 | 50 | 1 | 1 | 271 | 994.0 | 3.67 |
| | | | interpolation pixel value | | | | | | | |
| Lh | 1 | 17.8 | 75.9 | 98.0 | 73.2 | 4.2 | 1 | 270 | 1047.9 | 3.88 |
| Lb | 1 | 16.2 | 83.4 | 1000 | 59.9 | 11 | 1 | 271 | 1046.3 | 3.86 |
| Lh + Lb/2 | 1 | 17 | 79.7 | 98.9 | 66.5 | 7.4 | 1 | 271 | 1047.1 | 3.87 |

TABLE 5 center of gravity by result of edge extraction L' [x, y]

| | x-coordinate | | | | | | | on each line | | |
|---|---|---|---|---|---|---|---|---|---|---|
| | 1 | 2 | 3 | 4 | 5 | 6 | 7 | luminance total | moment | center of gravity |
| y-coordinate | | | | | | | | | | |
| 1 | | 4 | 65 | 30 | 10 | 85 | 4 | 0 | 198 | 713.0 | 3.60 |
| 2 | | | | | | | | 198 | 669.0 | 3.38 |
| 3 | | 19 | 79 | 1 | 50 | 49 | 0 | 0 | 198 | 625.0 | 3.16 |
| | | | interpolation pixel value | | | | | | | |
| Lh | 1 | 19.4 | 76.7 | 97.8 | 71.1 | 4.1 | 1 | 270 | 1041.2 | 3.85 |
| Lb | 1 | 15.8 | 81.4 | 99.8 | 61.1 | 12 | 1 | 271 | 1052.9 | 3.89 |
| Lh + Lb/2 | 1 | 17.6 | 79.1 | 98.8 | 66.1 | 8 | 1 | 271 | 1047.1 | 3.87 |

Table 4 shows a specific example of interpolation pixel values Lh(x, ym), Lb(x, ym), L(x, ym)={Lh(x, ym)+Lb(x, ym)}/2 in a case where the centers of gravity Xhg and Xbg in the upper and lower reference unit sections used for finding the amount of shift Xg are calculated from the luminance value in the step 31 shown in FIG. 31.

Table 5 shows a specific example of interpolation pixel values Lh(x, ym), Lb(x, ym), L(x, ym)={Lh(x, ym)+Lb(x, ym)}/2 in a case where the centers of gravity Xhg and Xbg in the upper and lower reference unit sections used for finding the amount of shift Xg are calculated from the results of the edge extraction in the step 31 shown in FIG. 31.

Figure 34:
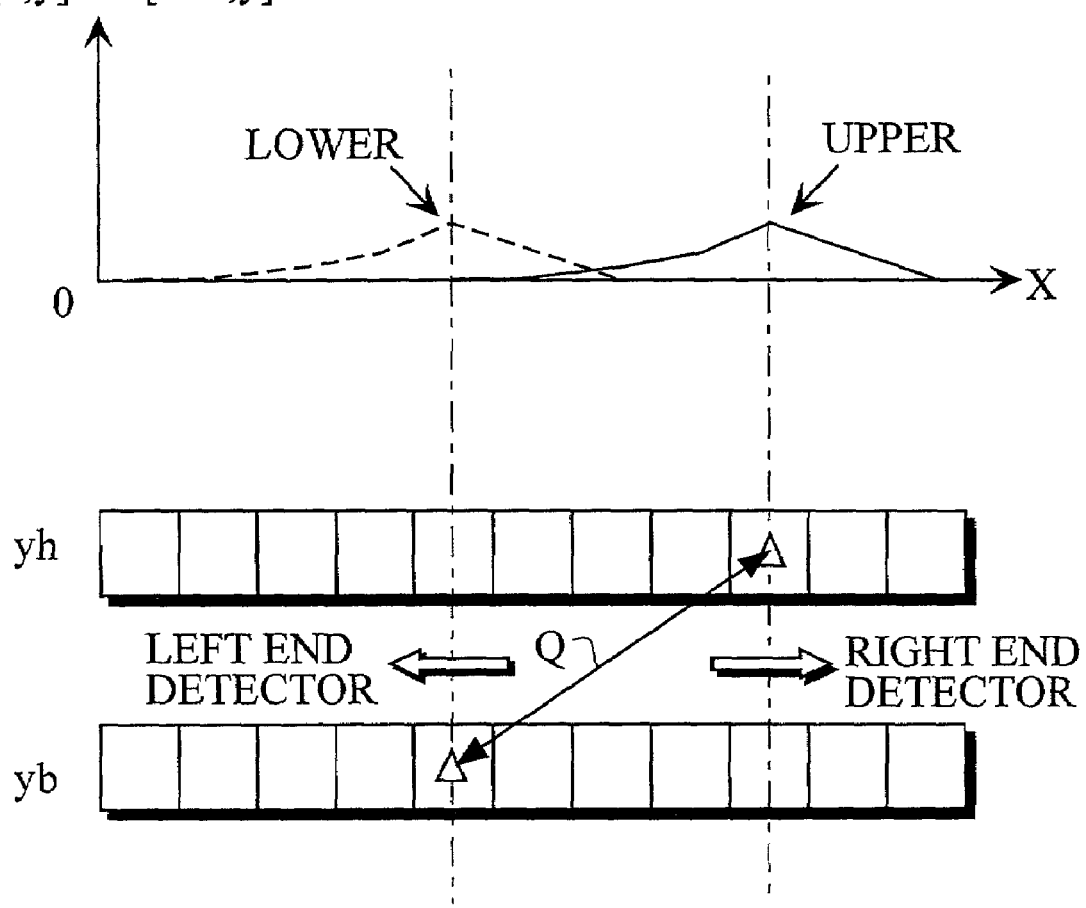
FIG. 34 is a schematic view for explaining the procedure for setting in a case where a unit section is set along an edge of an object.

The foregoing description will be grasped paradoxically. If a method of taking upper and lower reference unit sections is devised such that an object including an edge enters the upper reference unit section and the lower reference unit line in the vicinity of the edge, as shown in FIG. 34. The peak of the difference value is then found for each line, to determine a pixel distance in the horizontal direction between the peak of an upper line (indicated by a solid line) and the peak of a lower line (indicated by a broken line).

A pixel at which the difference between pixel values on the upper and lower lines is small is searched for in such a shape that the pixel distance in the horizontal direction is held. That is, a rightward and leftward arrow Q in the drawing is successively moved leftward in parallel, and the pixel values of pixels at which the ends of the rightward and leftward arrow Q are positioned are compared with each other, to take the pixels between which there is a difference smaller than a predetermined value as a left end of the reference unit section. Similarly, the rightward and leftward arrow Q in the drawing is successively moved rightward in parallel, and the pixel values of pixels at which the ends of the rightward and leftward arrow Q are positioned are compared with each other, to take the pixels between which there is a difference smaller than a predetermined value as a right end of the reference unit section.

[6] Application to Scaling Processing

Description of a method of applying the second embodiment to scaling processing.

In the case of the scaling processing, an interpolation value must be obtained at an arbitrary position. Therefore, the second embodiment is applied to the scaling processing by slightly changing the handling of the amount of shift between the upper and lower reference unit sections which has been handled in the foregoing description and changing the addition ratio of the interpolation pixel values calculated from the upper and lower reference unit sections.

Figure 35:
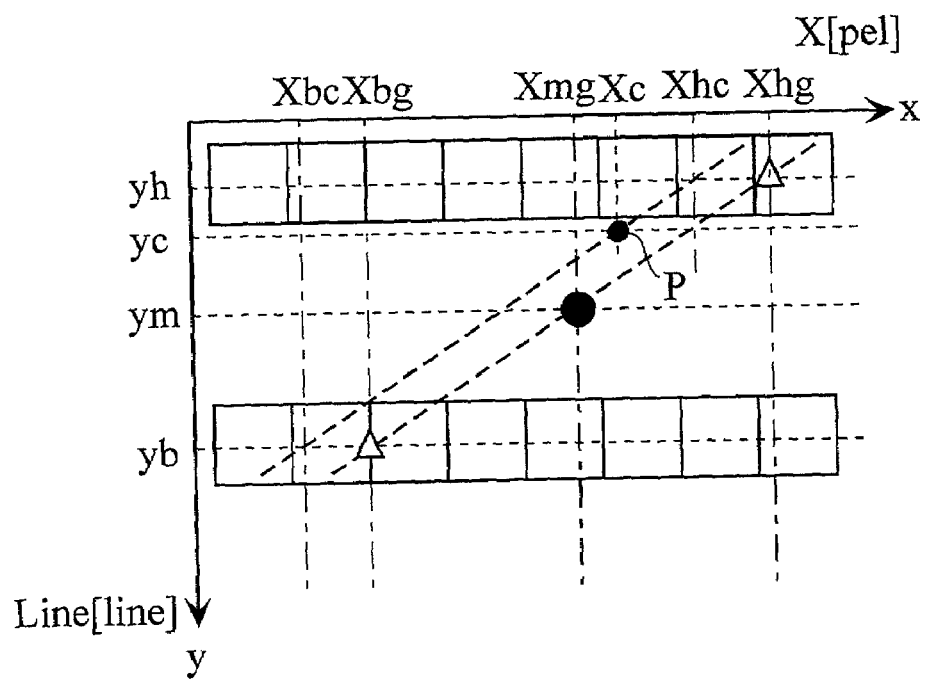
FIG. 35 is a schematic view for explaining a method of calculating an interpolation pixel value in a case where the second embodiment is applied to scaling processing.

Referring now to FIG. 35, description is made by taking a case where a pixel value L[Xc, yc] corresponding to a position P indicated by coordinates (Xc, yc) is calculated as an example.

The value of the pixel to be interpolated is calculated, by finding a straight line parallel to a straight line passing through the center of gravity in the upper reference unit section and the center of gravity in the lower reference unit section and passing through a pixel at the position P, on the basis of the pixel value of a pixel at an intersection of the straight line and each of the reference unit sections. The foregoing will be described in more detail.

In this example, the center of gravity in the upper reference unit section shall be at a position (Xhg, yh) as indicated by a Δ mark in FIG. 35, and the center of gravity in the lower reference unit section shall be at a position (Xbg, yb) as indicated by a Δ mark in FIG. 35. An equation of a straight line passing through the center of gravity (Xhg, yh) in the upper reference unit section and the center of gravity (Xbg, yb) in the lower reference unit section is expressed by the following equation (25):

$$y = \frac{(yb - yh)}{(Xbg - Xhg)} \times (X - Xhg) + yh \quad (25)$$

An equation of a straight line parallel to the above-mentioned straight line and passing through the point P (Xc, yc) is found by the following equation (26):

$$y = \frac{(yb - yh)}{(Xbg - Xhg)} \times (X - Xc) + yc \quad (26)$$

Coordinates (Xhc, yh) at an intersection of a straight line indicated by y=yh and the straight line expressed by the foregoing equation (26) are calculated, and the positional relationship between an X-coordinate Xhc and a boundary between existent pixels on the upper reference unit section is then considered, to find an interpolation pixel value Lh[Xc,yc] estimated from the upper reference unit section by the following equation (27):

$$Lh[Xc, yc] = L[INT(Xhc), yh] \times \{1 - FMOD(Xhc + 0.5, 1)\} + \quad (27)$$
$$L[INT(Xhc) + 1, yh] \times FMOD(Xhc + 0.5, 1)$$

Xhc is calculated by the following equation (28):

$$Xhc = \frac{(yh - yc)}{(yb - yh)} \times (Xbg - Xhg) + Xc \quad (28)$$

Similarly, coordinates (Xbc, yb) at an intersection of a straight line indicated by y=yb and the straight line expressed by the foregoing equation (26) are calculated, and the positional relationship between an X-coordinate Xbc and a boundary between existent pixels on the lower reference unit section is then considered, to find an interpolation value Lb[Xc,yc] estimated from the lower reference unit section by the following equation (29):

$$Lb[Xc, yc] = L[INT(Xbc), yb] \times \{1 - FMOD(Xbc + 0.5, 1)\} + \quad (29)$$
$$L[INT(Xbc) + 1, yb] \times FMOD(Xbc + 0.5, 1)$$

Xbc is calculated by the following equation (30):

$$Xbc = \frac{(yb - yc)}{(yb - yh)} \times (Xbg - Xhg) + Xc \quad (30)$$

A method using either one of Lh[Xc, yc] found in the foregoing equation (27) and Lb[Xc, yc] found in the foregoing equation (29) as the interpolation pixel value L[Xc, yc] is also considered. However, Lh[Xc, yc] and Lb[Xc, yc] are generally weighted and added to find an interpolation pixel value L[Xc, yc] such that it is inversely proportional to the ratio of the distance in the vertical direction from the interpolation pixel position P to the upper reference unit section to the distance in the vertical direction from the interpolation pixel position P to the lower reference unit section.

That is, the interpolation pixel value L[Xc, yc] is found by the following equation (31):

$$L[Xc, yc] = \frac{yb - yc}{yb - yh} \times Lh[Xc, yc] + \frac{yc - yh}{yb - yh} \times Lb[Xc, yc] \quad (31)$$

As also described in the description of IP conversion, it is possible to also select a group of pixel values each having a center of gravity in an interpolation section which is close to an ideal center of gravity Gcg indicated by the following equation (32):

$$Gcg = \frac{yb - yc}{yb - yh} \times Ghg + \frac{yc - yh}{yb - yh} \times Gbg \quad (32)$$

Scaling processing realized in a form conforming to the second embodiment will be described.

The interpolation pixel value determination processing by a new method described in the second embodiment (see FIG. 26, FIG. 27, and FIG. 28) and the scaling processing described using FIG. 35 as an example differ in an y-coordinate for setting an interpolation unit section. That is, although in the second embodiment realizing IP conversion, the interpolation unit section is set in a point just intermediate between the upper and lower reference unit sections, the interpolation unit section is set to an arbitrary y-coordinate between the upper reference unit section and the lower reference unit section in the scaling processing.

In order to realize the scaling processing in a form conforming to the second embodiment, therefore, the equation (14) used for calculating the x-coordinate Xmg of the center of gravity in the interpolation unit section in the second embodiment and the equation (15) used for calculating the amount of shift ΔXg between the reference unit sections in the second embodiment must be changed.

Description is now made by taking FIG. 35 as an example. When the interpolation unit section including the interpolation pixel value L[Xc, yc] is set, the interpolation unit section is first set on a horizontal line (y=yc) including the interpolation pixel value L[Xc, yc].

The center of gravity in the interpolation unit section including the interpolation pixel value L[Xc, yc] is the intersection of a straight line connecting the center of gravity (Xhg, yh) in the upper reference unit section and the center of gravity (Xbg, yb) in the lower reference unit section and a straight line expressed by y=yc. Consequently, the x-coordinate Xcg of the center of gravity in the interpolation unit section is found by the following equation (33):

$$Xcg=\{(yb-yc)\times Xhg+(yc-yh)\times Xbg\}\div(yb-yh) \quad (33)$$

The amount of shift between the reference unit sections must be separately found between the upper reference unit section and the lower reference unit section, unlike that in the second embodiment. An amount of shift ΔXgh in the upper reference unit section and an amount of shift ΔXgb in the lower reference unit section are found by the following equation (34):

$$\Delta Xgh=(yc-yh)\times(Xbg-Xhg)\div(yb-yh)$$

$$\Delta Xgb=(yb-yc)\times(Xbg-Xhg)\div(yb-yh) \quad (34)$$

The pixel value Lh[x, yc] in the upper reference unit section corresponding to the interpolation pixel and the pixel value Lb[x, yc] in the lower reference unit section corresponding to the interpolation pixel are found by the following equation (35) corresponding to the equation (16) described in the second embodiment:

$$Lh[x, yc] = L[INT(x - \Delta Xgh), yh] \times \{1 - FMOD(\text{Wide} - \Delta Xgh, 1)\} + \quad (35)$$
$$L[INT(x - \Delta Xgh) + 1, yh] \times FMOD(\text{Wide} - \Delta Xgh, 1)$$

$$Lb[x, yc] = L[INT(x + \Delta Xgb), yb] \times \{1 - FMOD(\text{Wide} + \Delta Xgb, 1)\} +$$
$$L[INT(x + \Delta Xgb) + 1, yb] \times FMOD(\text{Wide} + \Delta Xgb, 1)$$

Although it is considered that either one of Lh[x, yc] and Lb[x, yc] found in the foregoing equation (35) is used as the pixel value L[x, yc] of the interpolation pixel, an average value of Lh[x, yc] and Lb[x, yc] is used herein.

[7] Description of Expansion of Interpolation Method in Vertical Direction

Although description was made of the interpolation method using the existent line in the horizontal direction, the principle of the method can be also adapted to an interpolation method using an existent column in the vertical direction.

Figure 37:
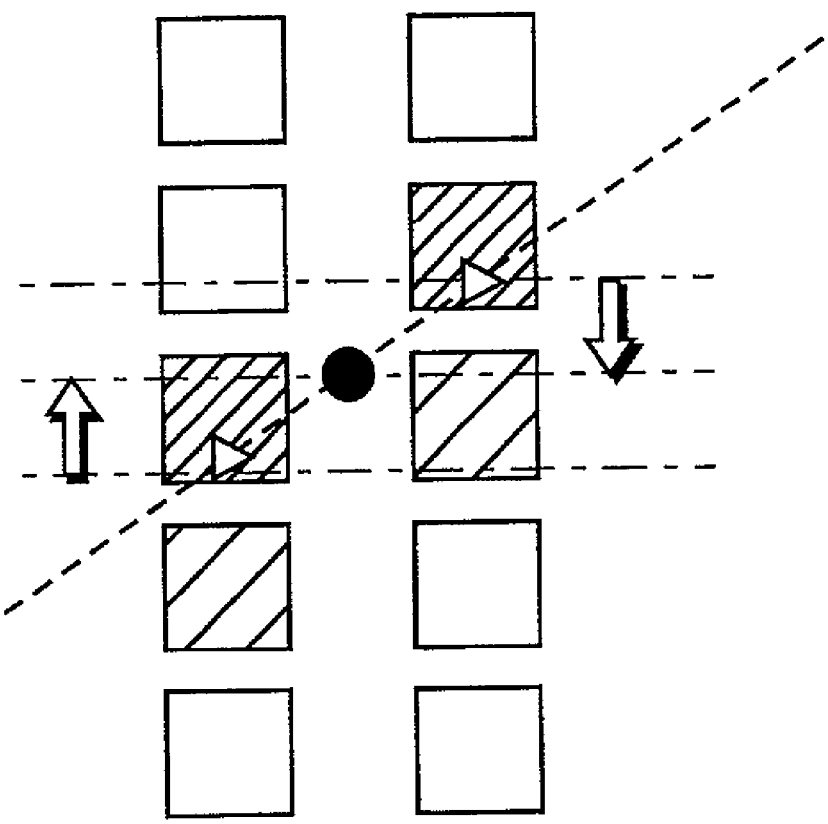
FIG. 37 is a schematic view showing centers of gravity in a left reference unit section and a right reference unit section and a center of gravity in an interpolation unit section found by the centers of gravity.

The principle of the method in a case where it is also adapted to the interpolation method using the existent column in the vertical direction will be described using FIGS. 37 and 38.

Figure 36:
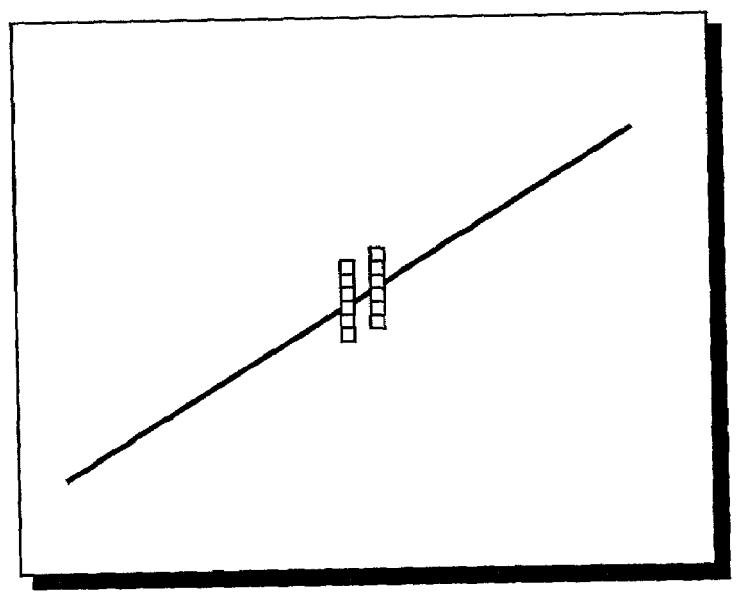
FIG. 36 is a schematic view for explaining the principle in a case where a method according to the second embodiment is adapted to an interpolation method using an existent column in the vertical direction, which illustrates right and left reference unit sections set such that an edge boundary is interposed therebetween on an original image.

Now suppose an image in which one line is drawn within a white background, as shown in FIG. 36. An edge boundary is detected by an edge detection filter such as a Laplacian conventionally well known, and right and left reference unit sections are set such that the edge boundary is interposed therebetween.

A center of gravity (indicated by a Δ mark) in the left reference unit section and a center of gravity (indicated by a Δ mark) in the right reference unit section are calculated, and a point just intermediate therebetween is taken as a center of gravity (indicated by a black circle mark) in the interpolation unit section.

Figure 38:
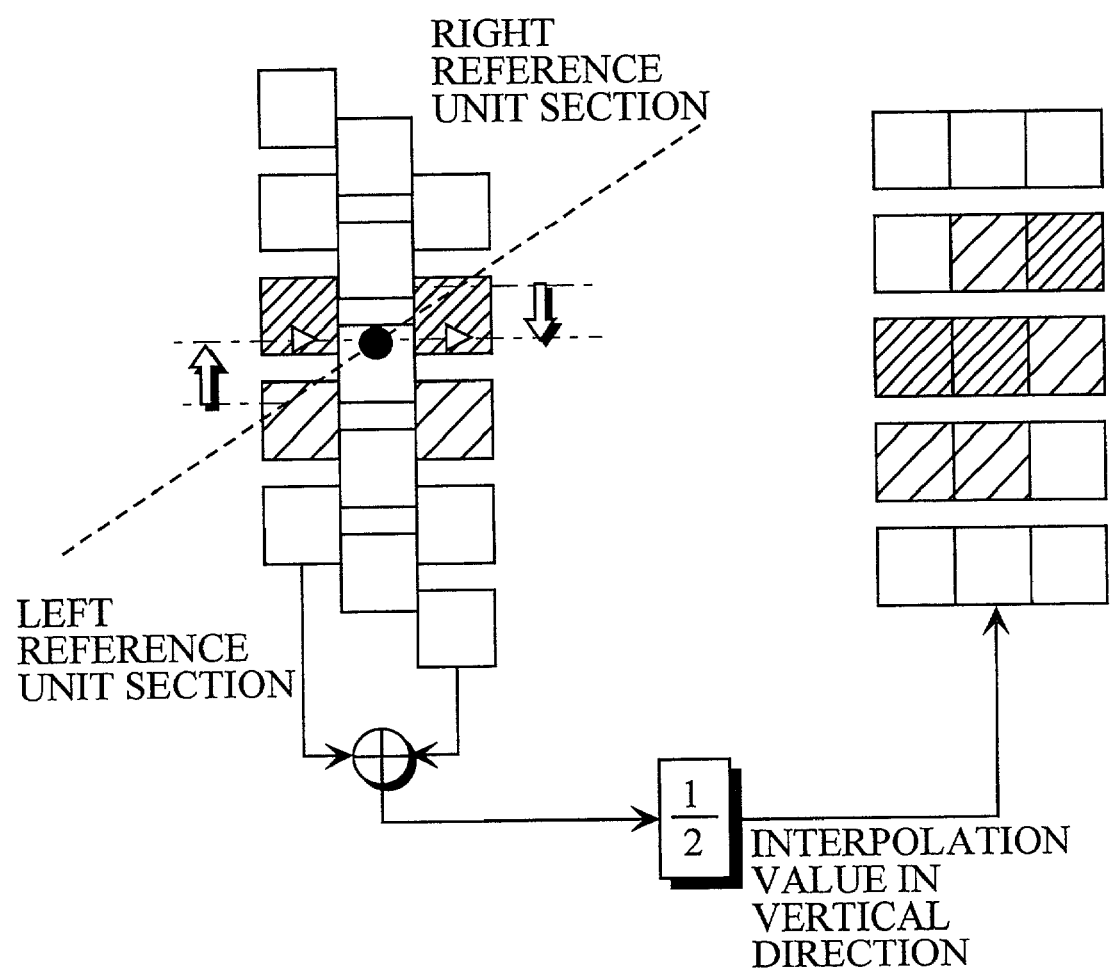
FIG. 38 is a schematic view showing a state where right and left reference unit sections are shifted in the vertical direction such that respective centers of gravity in right and left reference unit sections coincide with a center of gravity in an interpolation unit section.

The right and left reference unit sections are then shifted in the vertical direction such that the centers of gravity in the right and left reference unit sections respectively coincide with the center of gravity in the interpolation unit section, as shown in FIG. 38. In this state, the pixel value of each of the pixels in the interpolation unit section is determined by line-interpolation between the left reference unit section and the right reference unit section while considering a pixel boundary between the reference unit section and the interpolation unit section.

[8] Description of Effect by Using Center of Gravity

Description is made of an effect by using a center of gravity. In the method according to the present invention, interpolation is performed so as to hold a center of gravity in an edge within a space, thereby making it possible to hold the spatial continuity of the edge. Therefore, it is possible to produce a more natural and smoother edge, as compared with that in another interpolation method utilizing no center of gravity. Further, it is possible to reduce flicker by interpolation of the edge frequently seen in another interpolation method utilizing no center of gravity.

The foregoing will be described in more detail. An existent object is moved or deformed with any stability in order to hold the shape of the object itself existing in a time special manner as the destiny of the object. For example, an automobile moves in the form of an automobile, and a human being deforms in a range in which the shape of a human being is not lost. Therefore, a contour forming the shape of the object moves with any stability.

Even in the field of video, this tendency is the same. As apparent from progressive video picked up in order not to generate aliasing, an edge in the same portion of the same object is stably changed with continuity between continuous fields.

In the present invention, the concept of an edge center of gravity is introduced as a scale for measuring the stability of the contour of the object. An interpolation pixel is determined such that the edge center of gravity has linearity in unit regions including an edge of the same object.

When an interpolation value is determined so as to ensure the continuity of an edge in a time space which the original image has as in the present invention, the continuity of the edge in the time space which the original image originally has is also held. Therefore, a smooth edge is stably and continuously produced with continuity, thereby reducing flicker of the edge by interpolation seen in another interpolation method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An interpolation pixel value determining method for dividing a unit region including the contour of an object into reference unit sections for each line along a predetermined direction, and finding, using a region interposed between the two reference unit sections as an interpolation unit section, interpolation pixel values in the interpolation unit section, comprising the steps of calculating a luminance total, a moment and a center of gravity in each of the two reference unit sections with the interpolation unit section interposed therebetween;

finding from the luminance totals, the moment and the centers of gravity in the two reference unit sections the estimated values of a luminance total, a moment and a center of gravity in the interpolation unit section; and determining each of the interpolation pixel values in the interpolation unit section such that the luminance total, the moment and the center of gravity in the interpolation unit section are respectively values close to the estimated values.

2. An interpolation pixel value determining method comprising:

a first step of detecting an edge, and setting two reference unit sections, which are parallel to each other, each including the detected edge and composed of an existent pixel train;

a second step of setting an interpolation unit section in a region interposed between the two reference unit sections;

a third step of calculating a center of gravity in each of the reference unit sections;

a fourth step of shifting each of the reference unit sections such that the center of gravity in each of the reference unit sections coincides with a center of gravity in the interpolation unit section, using a point just intermediated between the respective centers of gravity in both the reference unit sections as the center of gravity in the interpolation unit section; and a fifth step of calculating the pixel value of each of pixels in the interpolation unit section on the basis of the pixel values in both the reference unit sections after the shifting in consideration of the positional relationship between each of pixels in both the reference unit sections after the shifting and each of pixels in the interpolation unit section.

3. The interpolation pixel value determining method according to claim 2, wherein the fifth step comprises the steps of calculating, in a state where each of the reference unit sections is shifted, for each of the interpolation pixels in the interpolation unit section, a first estimated value of the interpolation pixel from one or two pixels existing in a portion corresponding to the interpolation pixel in one of the reference unit sections, and calculating for each of the interpolation pixels in the interpolation unit section a second estimated value of the interpolation pixel from one or two pixels existing in a portion corresponding to the interpolation pixel in the other reference unit section, and calculating for each of the interpolation pixels in the interpolation unit section an average value of the estimated values calculated from both the reference unit sections with respect to the interpolation pixel, to find each of the interpolation pixel values in the interpolation unit section.

4. An interpolation pixel value determining method comprising:

a first step of detecting an edge, and setting two reference unit sections, which are parallel to each other, each including the detected edge and composed of an existent pixel train;

a second step of setting an interpolation unit section in a region interposed between the two reference unit sections;

a third step of calculating a center of gravity in each of the reference unit sections;

a fourth step of shifting each of the reference unit sections such that the center of gravity in each of the reference unit sections coincides with a center of gravity in the interpolation unit section using a point just intermediate between the centers of gravity in both the reference unit sections as the center of gravity in the interpolation unit section;

a fifth step of calculating, in a state where each of the reference unit sections is shifted, for each of the interpolation pixels in the interpolation unit section a first estimated value of the interpolation pixel from one or two pixels existing in a portion corresponding to the interpolation pixel in one of the reference unit sections, and calculating for each of the interpolation pixels in the interpolation unit section a second estimated value of the interpolation pixel from one or two pixels existing in a portion corresponding to the interpolation pixel in the other reference unit section;

a sixth step of calculating for each of the interpolation pixels in the interpolation unit section an average value of the estimated values calculated from both the reference unit sections with respect to the interpolation pixel, to find a third estimated value of the interpolation pixel; and a seventh step of taking as a first virtual interpolation unit section a pixel train in a case where it is assumed that the value of each of the interpolation pixels in the interpolation unit section is the first estimated value found in the fifth step, taking as a second virtual interpolation unit section a pixel train in a case where it is assumed that the value of each of the interpolation pixels in the interpolation unit section is the second estimated value found in the fifth step, and taking as a third virtual interpolation unit section a pixel train in a case where it is assumed that the value of each of the interpolation pixels in the interpolation unit section is the third estimated value found in the sixth step, to calculate respective centers of gravity in first to third virtual interpolation unit sections, and taking, out of the three virtual interpolation unit sections, each of pixel values in the virtual interpolation unit section in which the center of gravity is closest to the center of gravity in the interpolation unit section calculated from the centers of gravity in the two reference unit sections as a interpolation pixel value in the interpolation unit section.

5. An interpolation pixel value determining method comprising:

a first step of detecting an edge, and setting two reference unit sections, which are parallel to each other, each including the detected edge and composed of an existent pixel train;

a second step of setting an interpolation unit section in a region interposed between the two reference unit sections;

a third step of calculating a center of gravity in each of the reference unit sections;

a fourth step of setting a center of gravity in an interpolation unit section on a straight line connecting the centers of gravity in both the reference unit sections, and shifting each of the reference unit sections such that the center of gravity in each of the reference unit sections coincides with the center of gravity in the interpolation unit section; and a fifth step of calculating the pixel value of each of pixels in the interpolation unit section on the basis of pixel values in both the reference unit sections after the shifting in consideration of the positional relationship between each of pixels in both the reference unit sections after the shifting and each of the pixels the interpolation unit section.

\* \* \* \* \*